(12) United States Patent
Kim et al.

(10) Patent No.: US 11,636,861 B2
(45) Date of Patent: Apr. 25, 2023

(54) ELECTRONIC DEVICE AND METHOD OF OPERATION THEREOF

(71) Applicant: SAMSUNG ELECTRONICS CO., LTD., Suwon-si (KR)

(72) Inventors: Junhui Kim, Seoul (KR); Subhojit Chakladar, Suwon-si (KR); Tae-Jin Lee, Suwon-si (KR); Sanghoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 453 days.

(21) Appl. No.: 16/476,364

(22) PCT Filed: Oct. 18, 2017

(86) PCT No.: PCT/KR2017/011504
§ 371 (c)(1),
(2) Date: Jul. 8, 2019

(87) PCT Pub. No.: WO2018/131775
PCT Pub. Date: Jul. 19, 2018

(65) Prior Publication Data
US 2019/0355365 A1 Nov. 21, 2019

(30) Foreign Application Priority Data
Jan. 13, 2017 (KR) .......................... 10-2017-0006047

(51) Int. Cl.
*G10L 17/12* (2013.01)
*G06F 1/3209* (2019.01)
*G06F 1/3215* (2019.01)

(52) U.S. Cl.
CPC ............ *G10L 17/12* (2013.01); *G06F 1/3209* (2013.01); *G06F 1/3215* (2013.01)

(58) Field of Classification Search
CPC ....... G10L 17/12; G06F 1/3209; G06F 1/3215
See application file for complete search history.

(56) References Cited

U.S. PATENT DOCUMENTS 8,340,975 B1    12/2012   Rosenberger
9,226,101 B1 *  12/2015   Ludwig ............. H04M 3/42348
(Continued)

FOREIGN PATENT DOCUMENTS

KR    10-2016-0006464    1/2016
KR    10-2016-0064258    6/2016
KR    10-2016-0101198    8/2016

OTHER PUBLICATIONS

International Search Report for PCT/KR2017/011504 dated Mar. 26, 2018, 4 pages.
(Continued)

*Primary Examiner* — Santosh R Poudel
(74) *Attorney, Agent, or Firm* — Nixon & Vanderhye, P.C.

(57) ABSTRACT

Various embodiments of the disclosure provide a method and apparatus for processing a voice command in an electronic device. According to various embodiments of the disclosure, the electronic device includes a microphone, a memory, and a processor operatively coupled to the microphone and the memory. The processor may be configured to wake up on the basis of detection of a voice call command, calculate a score related to recognition of the voice call command, share the score with an external device, decide whether to execute a voice command on the basis of the score, and process the voice command on the basis of the decision result. Various embodiments are possible.

9 Claims, 21 Drawing Sheets

(56) References Cited

U.S. PATENT DOCUMENTS

| | | | |
|---|---|---|---|
| 9,319,993 B1* | 4/2016 | Urbanus | H04W 52/0258 |
| 2007/0061149 A1* | 3/2007 | Chang | H04N 21/47211 |
| | | | 704/E15.045 |
| 2009/0235170 A1* | 9/2009 | Golden | G06F 3/1454 |
| | | | 715/719 |
| 2012/0096499 A1* | 4/2012 | Dasher | H04N 21/47202 |
| | | | 725/87 |
| 2013/0197914 A1* | 8/2013 | Yelvington | G10L 15/22 |
| | | | 704/275 |
| 2014/0195233 A1* | 7/2014 | Bapat | G10L 15/30 |
| | | | 704/246 |
| 2015/0032456 A1 | 1/2015 | Wait | |
| 2016/0012820 A1 | 1/2016 | Mun et al. | |
| 2016/0104480 A1* | 4/2016 | Sharifi | G10L 15/32 |
| | | | 704/254 |
| 2016/0104483 A1* | 4/2016 | Foerster | G10L 15/02 |
| | | | 704/275 |
| 2016/0148615 A1 | 5/2016 | Lee et al. | |
| 2016/0155443 A1* | 6/2016 | Khan | G06F 1/3203 |
| | | | 704/275 |
| 2016/0171976 A1 | 6/2016 | Sun et al. | |
| 2017/0025124 A1* | 1/2017 | Mixter | G10L 15/22 |
| 2017/0139669 A1* | 5/2017 | Oh | H04M 1/6066 |

OTHER PUBLICATIONS

Written Opinion of the ISA for PCT/KR2017/011504 dated Mar. 26, 2018, 7 pages.

* cited by examiner

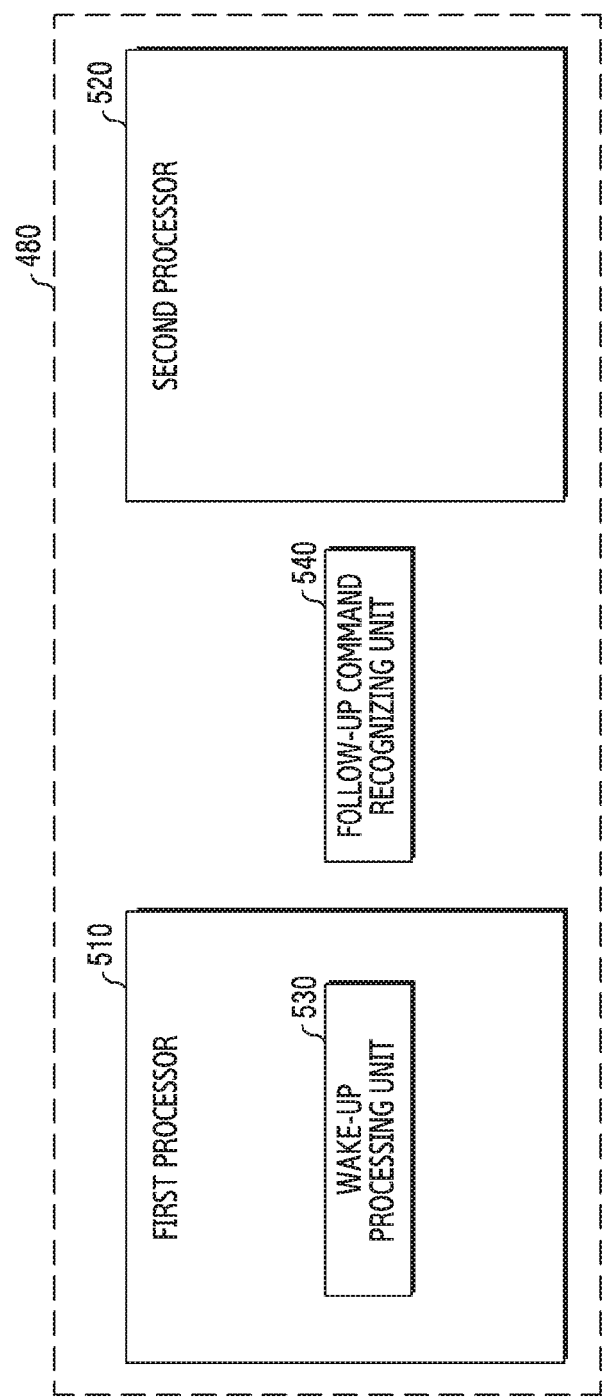

ELECTRONIC DEVICE AND METHOD OF OPERATION THEREOF

This application is the U.S. national phase of International Application No. PCT/KR2017/011504 filed Oct. 18, 2017 which designated the U.S. and claims priority to KR Patent Application No. 10-2017-0006047 filed Jan. 13, 2017, the entire contents of each of which are hereby incorporated by reference.

TECHNICAL FIELD

Various embodiments of the disclosure relate to a method and apparatus for processing a voice command in an electronic device.

BACKGROUND ART

Recently, with the development of digital technologies, various types of electronic devices are widely used such as a mobile communication terminal, a smart phone, a tablet Personal Computer (PC), a notebook, a Personal Digital Assistant (PDA), a wearable device, a digital camera, a personal computer, or the like.

Recently, various voice services (e.g., a voice recognition function) are developed and provided in the electronic device on the basis of a voice recognition technique. According to an embodiment, the electronic device provides a variety of life convenience services such as mobile search, schedule management, dialing, memo, or music playback based on a voice command of a user.

Summary

However, the user may use a plurality of electronic devices, and the same voice call command may be registered in the plurality of electronic devices. In this case, since the voice call command is simultaneously recognized in the plurality of electronic devices, not only an electronic device intended by the user but also a plurality of other electronic devices can be driven. As a result, voice commands for user's utterance are processed by electronic devices even if the electronic devices are not intended by the user, thereby causing user inconvenience. For example, a case may be assumed where the voice call command is equally registered as "Hi, ABC" to the plurality of electronic devices, and the user searches for a food recipe. According to an embodiment, the user may utter "Hi, ABC, recommend a good food recipe for summer". In this case, all of the plurality of electronic devices (e.g., a smart phone, a refrigerator, a TV, etc.) may wake up by the voice call command "Hi, ABC" to search for the food recipe redundantly, and may provide the user with a redundant result.

Various embodiments disclose a method and apparatus for processing voice commands based on an electronic device intended by a user of a plurality of electronic devices.

An electronic device according to various embodiments of the disclosure includes a microphone, a memory, and a processor operatively coupled to the microphone and the memory. The processor may be configured to wake up on the basis of detection of a voice call command, calculate a score related to recognition of the voice call command, share the score with an external device, decide whether to execute a voice command on the basis of the score, and process the voice command on the basis of the decision result.

A method of operating an electronic device according to various embodiments may include waking up on the basis of detection of a voice call command, calculating a score related to recognition of the voice call command, sharing the score with an external device, deciding whether to execute a voice command on the basis of the score, and processing the voice command on the basis of the decision result.

Various embodiments of the disclosure may include a computer readable recording medium recording a program for executing the method in the processor.

In an electronic device and an operating method thereof according to various embodiments, when a user uses the electronic device to execute (use) a function based on a voice command (e.g., a voice recognition function), the voice command can be processed without inconvenience on the basis of an intended device even if one voice call command is configured for the plurality of electronic devices. According to various embodiments of the disclosure, a voice is used to simply control the electronic device so that the user can perform a related operation by recognizing a voice command in the intended electronic device.

BRIEF DESCRIPTION OF THE DRAWINGS

FIGS. 5A, 5B and 5C illustrate an example of implementing a component for processing a voice command in an electronic device according to various embodiments of the disclosure;

DETAILED DESCRIPTION OF EXAMPLE EMBODIMENTS

Figure 1:
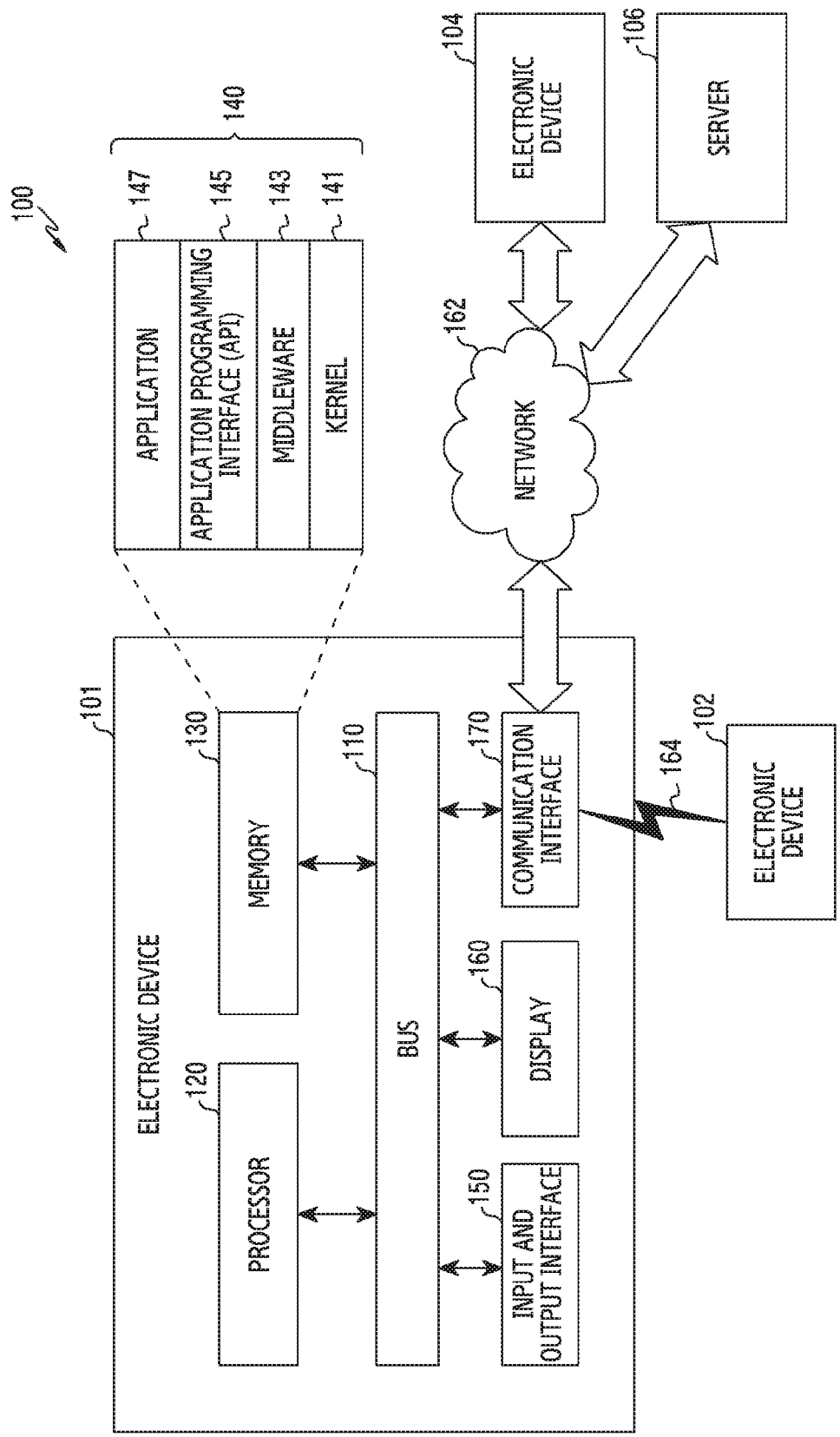
FIG. 1 illustrates a network environment including an electronic device according to various embodiments of the disclosure.

Hereinafter, various embodiments of the present disclosure are disclosed with reference to the accompanying drawings. It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B" or "at least one of A and/or B," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit). In some various embodiments of the present disclosure, an electronic device may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like). According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

An electronic device 101 in a network environment 100 according to various embodiments of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141. Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application. The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, an active matrix OLED (AMOLED), a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, at least one of wireless fidelity (Wi-Fi), wireless gigabit alliance (WiGig), Bluetooth, Bluetooth low energy (BLE), Zigbee, near field communication (NFC), magnetic secure transmission, radio frequency (RF), or body area network (BAN). The wireless communications according to an embodiment include GNSS. The GNSS may include, for example, global positioning system (GPS), global navigation satellite system (GLONASS), BeiDou navigation satellite system (BeiDou), or Galileo, the European global satellite-based navigation system. Hereinafter, the term "GPS" and the term "GNSS" may be interchangeably used.

The wired communications may include at least one of universal serial bus (USB), high definition multimedia interface (HDMI), recommended standard 232 (RS-232), power line communication, plain old telephone service (POTS), or the like.

The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

The server 106 may include, for example, at least one of voice recognition server, voice service providing server, data server, searching server, payment server, card company server, bank server, authentication server, application server, management server, integration server, provider server (or telecommunications operator server), content server, internet server, or cloud server.

Figure 2:
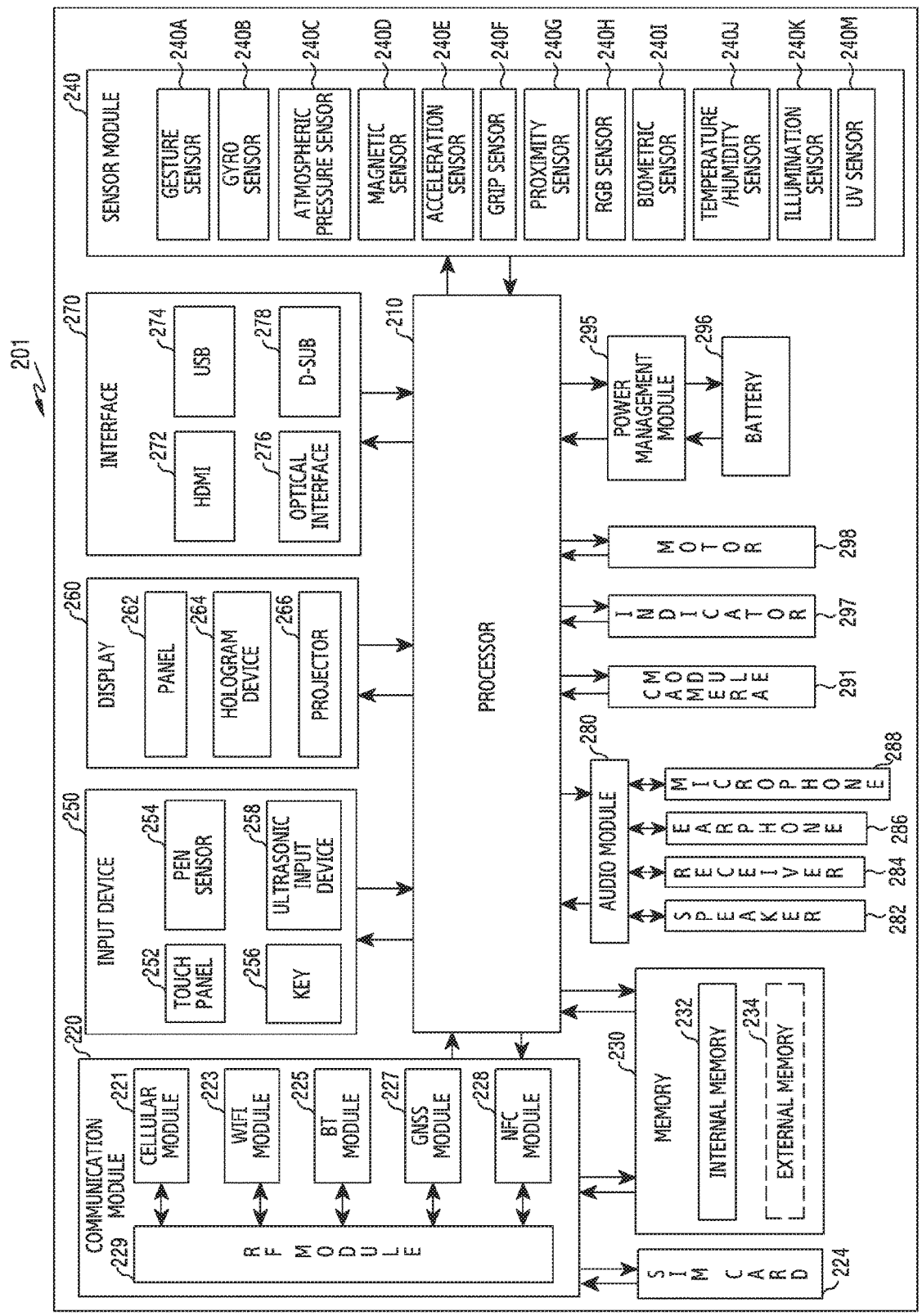
FIG. 2 is a block diagram of an electronic device according to various embodiments of the disclosure.

FIG. 2 is a block diagram illustrating an electronic device according to an embodiment of the present disclosure.

An electronic device 201 may include, for example, a part or the entirety of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. In various embodiments of the present disclosure, the electronic device 201 may include more element or less element than the foregoing elements because the foregoing elements described in FIG. 2 are not essential. In various embodiments of the present disclosure, the electronic device 201 may not include some of the foregoing elements. In various embodiments of the present disclosure, the elements of the electronic device 201 are embedded in a housing (or bezel, body) of the electronic device 201, or formed on exterior thereof.

The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 223, a Bluetooth (BT) module 225, a GNSS module 227, a NFC module 228, and a radio frequency (RF) module 229. The communication module 220 may further include, for example, WiGig module. According to an embodiment, the WiFi module 223 and the WiGig module may be implemented in a single integrated chip.

The cellular module 221 may provide, for example, a voice call service, a video call service, a text message service, or an Internet service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP). According to an embodiment of the present disclosure, at least a part (e.g., two or more) of the cellular module 221, the Wi-Fi module 223, the Bluetooth module 225, the GNSS module 227, and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227, or the NFC module 228 may transmit/receive RF signals through a separate RF module.

The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD). The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed. According to various embodiments, the input device 250 may include an electronic pen. According to various embodiments, the input device may be implemented to receive a force touch.

The display 260 (e.g., the display 160) may include a panel 262, a hologram device 264, a projector 266, and/or a control circuit for controlling them.

The panel 262 may be, for example, flexible, transparent, or wearable. The panel 262 and the touch panel 252 may be integrated into a single module. The panel 262 may include a force sensor for measuring strength of pressure according to a touch of a user. The force sensor may be implemented with the touch panel 252 or may be implemented independently in a form of one or more sensors.

The hologram device 264 may display a stereoscopic image in a space using a light interference phenomenon. The projector 266 may project light onto a screen so as to display an image. The screen may be disposed in the inside or the outside of the electronic device 201.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multimedia card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 3:
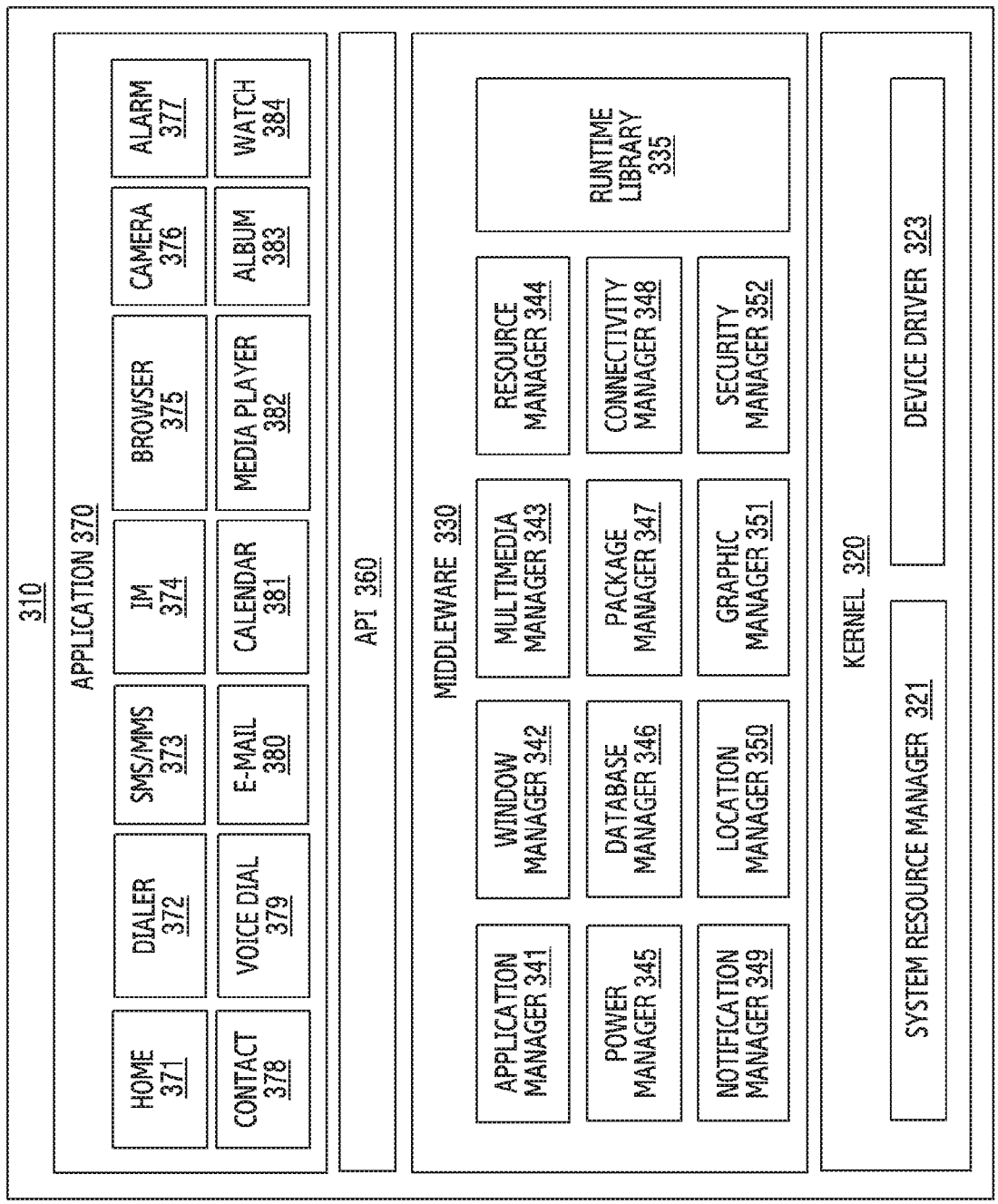
FIG. 3 is a block diagram of a program module according to various embodiments of the disclosure.

FIG. 3 is a block diagram illustrating a program module according to an embodiment of the present disclosure.

According to an embodiment, a program module 310 (e.g., the program 140) may include an operating system (OS) for controlling a resource related to an electronic device (e.g., the electronic device 101, 201) and/or various applications (e.g., the application program 147) running on the OS. The operating system may be, for example, Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded on an electronic device or may be downloaded from an external electronic device (e.g., the first electronic device 102, the second external electronic device 104, or the server 106).

The kernel 320 may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330, for example, may provide a function that the applications 370 require in common, or may provide various functions to the applications 370 through the API 360 so that the applications 370 may efficiently use limited system resources in the electronic device.

According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information required for operating the electronic device.

The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication.

According to an embodiment of the present disclosure, in the case in which an electronic device (e.g., the electronic device 101) includes a phone function, the middleware 330 may further include a telephony manager for managing a voice or video call function of the electronic device. The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370, for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device, notification information generated in another application of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application running in the external electronic device, or a service provided from the external electronic device.

According to an embodiment of the present disclosure, the application 370 may include a specified application (e.g., a healthcare application of a mobile medical device) according to an attribute of the external electronic device.

The application 370 may include an application received from an external electronic device. According to various embodiments of the present disclosure, at least a part of the program module 310 may be implemented with software, firmware, hardware, or a combination thereof. At least a part of the program module 310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium (e.g., the memory 130) in the form of a program module. In the case where the instructions are performed by a processor (e.g., the processor 120, 210), the processor may perform functions corresponding to the instructions.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like).

The program instructions may include machine language codes generated by compilers and high-level language codes that can be executed by computers using interpreters.

According to various embodiments, the recording medium may include a computer-readable recording medium to record a program for executing various method described below at the processor 120, 210.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Various embodiments of the disclosure provide a method and apparatus for processing a voice command (or a voice recognition function, a voice service) in an electronic device. According to various embodiments, provided is a method and apparatus for processing a voice command when a voice call command (e.g., a wake-up word or a wake-up command) by which an electronic device can recognize a start of a voice recognition function is equally registered in a plurality of electronic devices. According to various embodiments, in a multi-device environment in which the same voice call command can be recognized, a plurality of electronic devices may wake up on the basis of the same voice call command and thereafter may automatically determine a master device for executing voice command recognition and/or feedback. According to various embodiments, an action (or an operation, a function) depending on the voice command may be executed based on the master device, or an electronic device for executing the action may be selected and controlled.

An electronic device according to various embodiments may include all devices using one or more of various processors such as an Application Processor (AP), a Communication Processor (CP), a Graphic Processing Unit (GPU), a Central Processing Unit (CPU), and the like. For example, the electronic device according to various embodiments may include an information communication devices, a multimedia device, a wearable device, an Internet of Things (IoT) device, or various other devices corresponding to these devices.

Hereinafter, an operating method and apparatus will be described according to various embodiments of the disclosure with reference to the accompanying drawings. However, since the various embodiments of the disclosure are not restricted or limited by the content described below, it should be noted that the disclosure is applicable to the various embodiments on the basis of embodiments described below. A hardware-based access method is described for example in the various embodiments of the disclosure described hereinafter. However, since the various embodiments of the disclosure include a technique in which hardware and software are both used, a software-based access method is not excluded in various embodiments of the disclosure.

Figure 4:
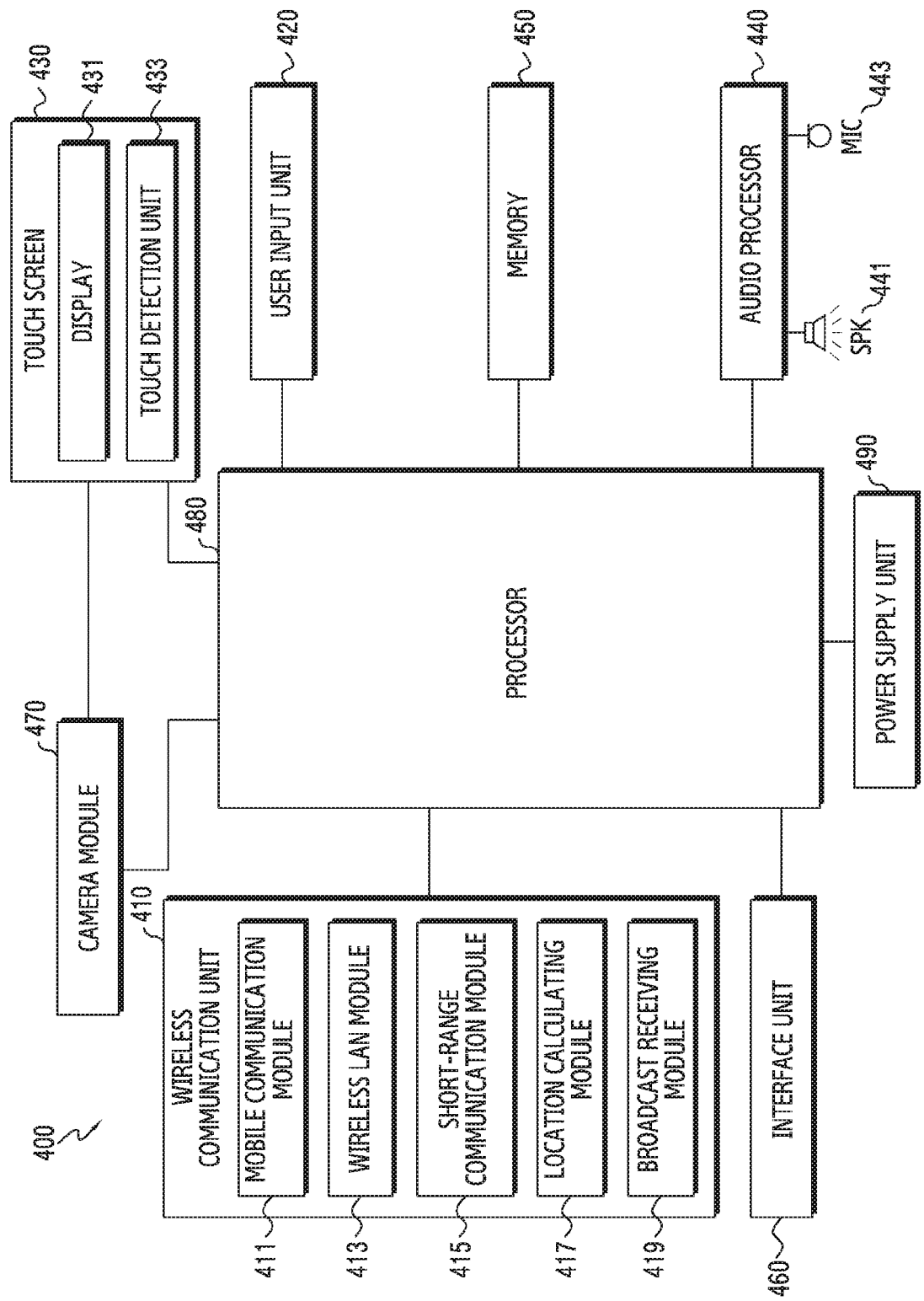
FIG. 4 briefly illustrates a structure of an electronic device according to various embodiments of the disclosure.

FIG. 4 briefly illustrates a structure of an electronic device according to various embodiments of the disclosure.

Referring to FIG. 4, an electronic device 400 according to various embodiments may include, for example, a wireless communication unit 410, a user input unit 420, a touch screen 430, an audio processor 440, a memory 450, an interface 460, a camera module 470, a processor 480 (e.g., the processor 120 of FIG. 1, the processor 210 of FIG. 2), and a power supplier 490. In various embodiments, the electronic device 400 is not necessarily constructed of components of FIG. 4, and thus the number of components thereof may be greater than or less than the number of components of FIG. 4.

The wireless communication unit 410 may be constructed identically or similarly, for example, to the communication module 220 of FIG. 2. The wireless communication unit 410 may include one or more modules for enabling wireless communication between the electronic device 400 and a different external electronic device (e.g., the electronic device 102 or 104, the server 106). For example, the wireless communication unit 410 may include a mobile communication module 411, a Wireless Local Area Network (WLAN) module 413, a short-range communication module 415, a location calculation module 417, or the like. In various embodiments, the wireless communication unit 410 may include a module for performing communication with a neighboring external electronic device (e.g., a short-range communication module, a long-range communication module, or the like).

The mobile communication module 411 may be constructed identically or similarly, for example, to the cellular module 221 of FIG. 2. The mobile communication module 411 may transmit/receive a radio signal with respect to at least one of a base station, an external electronic device (e.g., the different electronic device 104), and various servers on a mobile communication network. The radio signal may include a voice signal, a data signal, or various types of control signals. The mobile communication module 411 may transmit a variety of data required for an operation of the electronic device 400 to an external device (e.g., the server 106 or the different electronic device 104 or the like) in response to a user request.

The WLAN module 413 may be constructed identically or similarly, for example, to the WiFi module 223 of FIG. 2. The WLAN module 413 may indicate a module for establishing a WLAN link with respect to a wireless Internet access and an external device (e.g., the different electronic device 102 or the server 106 or the like). The WLAN module 413 may be placed inside or outside the electronic device 400. A wireless Internet technique may use Wireless Fidelity (WiFi), Wireless broadband (Wibro), World interoperability for Microwave access (WiMax), High Speed Downlink Packet Access (HSDPA), millimeter Wave (mmWave), or the like. The WLAN module 413 may be directly coupled to the electronic device 400 or interwork with the external device (e.g., the different electronic, etc.) coupled through a network (e.g., the wireless Internet network) (e.g., the network 162 of FIG. 1), to transmit a variety of data of the electronic device 400 to the outside or receive the data from the outside. The WLAN module 413 may maintain an always-on state, or may be turned on/turned off according to a configuration of the electronic device 400 or a user input.

The short-range communication module 415 may indicate one or more modules (e.g., the Bluetooth module 225, the NFC module 228, etc.) for performing short-range communication. A short-range communication technique may use, for example, Bluetooth, Bluetooth Low Energy (BLE), Radio Frequency IDentification (RFID), Infrared Data Association (IrDA), Ultra Wideband (UWB), ZigBee, Near Field Communication (NFC), or the like. The short-range communication module 415 may transmit a variety of data of the electronic device 400 to the outside or receive the data from the outside by interworking with the external device (e.g., the different electronic device 102, etc.) coupled to the electronic device 400 through a network (e.g., a short-range communication network). The short-range communication module 415 may maintain an always-on state, or may be turned on/turned off according to a configuration of the electronic device 400 or a user input.

The location calculation module 417 may be constructed identically or similarly, for example, to the GNSS module 227 of FIG. 2. The location calculation module 417 is a module for acquiring a location of the electronic device 400, and a representative example thereof may include a Global Position System (GPS) module. The location calculation module 417 may measure the location of the electronic device 400 according to a triangulation principle.

The user input unit 420 may generate input data for controlling the operation of the electronic device 400 in response to a user input. The user input unit 420 may include at least one input means for detecting various user inputs. For example, the user input unit 420 may include a key pad, a dome switch, a physical button, a touch pad (static pressure/electrostatic), jog & shuttle, a sensor (e.g., the sensor module 240 of FIG. 2), or the like.

The user input unit 420 may be partially implemented outside the electronic device 400 in a button form, and may be partially or entirely implemented with a touch panel. The user input unit 420 may receive a user input for initiating various operations (e.g., a voice recognition function, an application execution function, a capture function, a data creation function, a data reproduction function, etc.) of the electronic device 400, and may produce an input signal based on the user input.

The touch screen 430 may indicate an input/output device capable of simultaneously performing an input function and a display function. According to various embodiments, the touch screen 430 may include a display 431 (e.g., the display 160 of FIG. 1 or the display 260 of FIG. 2) and a touch detector 433. The touch screen 430 may provide an input/output interface between the electronic device 400 and the user. For example, the touch screen 430 may deliver a touch input of the user to the electronic device 400, or may play a mediation role for showing an output from the electronic device 400 to the user. The touch screen 430 may show a visual output to the user. The visual output may be shown in a form of a text, a graphic, a video, and a combination of them.

The display 431 may display (output) a variety of information processed in the electronic device 400. For example, the display 431 may display various User Interfaces (UIs) or Graphic UI (GUIs) related to using of the electronic device 400. According to various embodiments, the display 431 may provide various screen configurations to provide the user with a feedback indicating whether it is in an active (or timeout) state during a voice recognition duration (or period) for processing a voice command. Various displays (e.g., the display 160 of FIG. 1) may be used as the display 431. In various embodiments, a curved display (or a bended display) may be used as the display 431.

The touch detector 433 may be mounted on the display 431, and may detect a user input which is in contact with or approaches to a surface of the touch screen 430. The user input may include a touch event or a proximity event which is input based on at least one of a single-touch, a multi-touch, a hovering, and an air gesture. In various embodiments, the touch detector 433 may receive a user input for initiating an operation related to a usage of the electronic device 400, and may generate an input signal depending on the user input. The touch detector 433 may be configured to convert a change in a pressure applied to a specific portion of the display 431 or a capacitance or the like which is generated at a specific portion of the display 431 into an electrical input signal. The touch detector 433 may detect a location and area in which an input tool (e.g., a user's finger, an electronic pen, etc.) is in touch with or approaches to the surface of the display 431. Further, the touch detector 433 may be implemented to be able to detect up to a pressure (e.g., a force touch) when a touch is made according to an applied touch mechanism.

The audio processor 440 may be constructed identically or similarly, for example, to the audio module 280 of FIG. 2. The audio processor 440 may perform a function of transmitting an audio signal input from the processor 480 to a speaker (SPK) 441 and delivering an audio signal such as a voice or the like input from a microphone (MIC) 443 to the processor 480. The audio processor 440 may output voice/sound data by translating it into an audible sound through the SPK 441 under the control of the processor 480, and may deliver an audio signal such as a voice or the like received from the MIC 443 by translating it into a digital signal.

The SPK 441 may output audio data received from the wireless communication unit 410 or stored in the memory 450. The SPK 441 may output a sound signal related to various operations (functions) performed in the electronic device 400.

The MIC 443 may receive an external sound signal, and may process it as electrical voice data. Various noise reduction algorithms may be implemented in the MIC 443 to remove a noise generated in a process of receiving the external sound signal. The MIC 443 may manage an input of audio streaming such as a voice command (e.g., a voice command for controlling activation/deactivation of a voice recognition function or the like).

The memory 450 (e.g., the memory 130 of FIG. 1 or the memory 230 of FIG. 2) may store one or more programs executed by the processor 480, and may perform a function for temporarily storing data to be input/output. The data to be input/output may include, for example, a file such as a video, an image, a photo, an audio, or the like. The memory 450 may play a role of storing acquired data in such a manner that data acquired on a real-time basis is stored in a temporary storage device (e.g., a buffer) and data confirmed to be stored is stored in a long-term storage device.

The memory 450 may store one or more programs and data related to execution of a voice recognition function or the like for processing a voice command by waking up according to a voice call command. According to various embodiments, the memory 450 may store one or more programs, data, or instructions related to allowing the processor 480 to wake up on the basis of detection of a voice call command, to calculate a score related to recognition of the voice call command, to share the score with an external device, to decide whether to execute the voice command in response to the score by interworking with the external device, and to process the voice command on the basis of the decision result. According to various embodiments, the memory 450 may store one or more programs, data, or instructions related to allowing the processor 480 to calculate the score, based at least in part on a distance to a user, an environment (e.g., a noise, etc.) of the electronic device 400, a location (e.g., a spatial or geographical location) of the electronic device 400, a domain of the electronic device 400, or a voice recognition rate.

The memory 450 may include an extended memory (e.g., the external memory 234 of FIG. 2) or an internal memory (e.g., the internal memory 232 of FIG. 2). The electronic device 400 may operate in association with a web storage which performs a storage function of the memory 450 on the Internet.

The memory 450 may include one or more application modules (or software modules). For example, a software component may include an operating system software module, a communication software module, a graphic software module, a user interface software module, a Moving Picture Experts Group (MPEG) module, a camera software module, one or more application software modules, or the like. In addition, a module as a software component can be expressed as a set of instructions, and thus may be expressed as an instruction set. The module may also be referred to as a 'program'. In various embodiments, the memory 450 may include additional modules (instructions) in addition to the aforementioned module. Optionally, some modules (instructions) may not be used.

The operating system software module may include several software components for controlling a general system operation. The control of the general system operation may imply, for example, memory management and control, storage hardware (device) control and management, power control and management, or the like. In addition, the operating system software module may perform a function for facilitating communication between several hardware components (devices) and software components (programs).

The communication software module may enable communication with other electronic devices such as a wearable device, a smart phone, a computer, a server, a television, a monitor, an Internet of Things (IoT) device, a mobile terminal, or the like via a communication module (e.g., the wireless communication unit 410, the communication module 220) or an interface (e.g., the interface 460, the interface 270). In addition, the communication software module may consist of a protocol structure associated with a corresponding communication scheme.

The graphic software module may include several software components for providing and displaying graphics on a display (e.g., the display 431, the display 260). In various embodiments, the term "graphic" may be used for the meaning including a text, a web page, an icon, a digital image, a video, an animation, or the like.

The user interface software module may include several software components related to a User Interface (UI). For example, the user interface software module may include content related to how a state of the user interface changes and in which condition the state of the user interface changes.

The MPEG module may include software components which enable digital content (e.g., video, audio)-related processes and functions (e.g., content creating, reproduction, distribution, transmission, etc.).

The camera software module may include a camera-related software component which enables camera-related processes and functions.

The application module may include a web browser including a rendering engine, an e-mail, an instant message, word processing, keyboard emulation, an address book, a touch list, a widget, a Digital Right Management (DRM), iris scan, context cognition (or context awareness), voice recognition, a position determining function, a location-based service, etc.

The memory 450 may include a computer readable recording medium recording a program for executing methods according to various embodiments in the processor 480.

According to various embodiments, a computer readable recording medium may include a computer readable recording medium recording a program for executing waking up on the basis of detection of a voice call command, calculating a score related to recognition of the voice call command, sharing the score with an external device, deciding whether to execute the voice command corresponding to the score by interworking with the external device, and processing the voice command on the basis of the decision result.

The interface 460 may be constructed identically or similarly, for example, to the interface 270 of FIG. 2. The interface 460 may receive data transmitted from the different electronic device, or may deliver supplied power to each component inside the electronic device 400. The interface 460 may allow data inside the electronic device 400 to be transmitted to the different electronic device. For example, a wired/wireless headphone port, an external charger port, a wired/wireless data port, a memory card port, an audio input/output port, a video input/output port, an earphone port, or the like may be included in the interface 460.

The camera module 470 (e.g., the camera module 291 of FIG. 2) is configured to support a capturing function of the electronic device 400. The camera module 470 may capture any subject under the control of the processor 480, and may deliver captured data (e.g., an image) to the display 431 and the processor 480.

According to various embodiments, the camera module 470 may include, for example, a first camera (e.g., a color (RGB) camera) for acquiring color information and a second camera (e.g., an InfraRed (IR) camera) for acquiring depth information (e.g., location information and distance information of the subject). The camera module 470 may include an image sensor. The image sensor may be implemented with a Charged Coupled Device (CCD) or a Complementary Metal-Oxide Semiconductor (CMOS). According to an embodiment, the first camera may be a front camera provided in a front surface of the electronic device 400. According to various embodiments, the front camera may be replaced with the second camera, and may not be provided in the front surface of the electronic device 400. According to various embodiments, the first camera may be disposed to the front surface of the electronic device 400 together with the second camera. According to an embodiment, the first camera may be a rear camera provided in a rear surface of the electronic device 400. According to an embodiment, the first camera may include both of the front camera and the rear camera which are provided respectively to the front surface and the rear surface of the electronic device 400.

The processor 480 (e.g., one or more control circuits including a processing circuitry) may provide an overall control to the electronic device 400. In various embodiments, the processor 480 may be constructed identically or similarly, for example, to the processor 120 of FIG. 1 or the processor 210 of FIG. 2.

According to various embodiments, the processor 480 may process waking up on the basis of detection of a voice call command, calculating a score related to recognition of the voice call command, sharing the score with an external device, deciding whether to execute the voice command corresponding to the score by interworking with the external device, and executing a function corresponding to a voice command on the basis of the decision result. According to various embodiments, the processor 480 may process calculating the score, based at least in part on a distance to a user, an environment of the electronic device 400, a location of the electronic device 400, a domain of the electronic device 400, or a voice recognition rate, transmitting the calculated score to an external device (e.g., a different electronic device, a server), receiving a response determined based on the score from the external device, and determining whether to execute the voice command on the basis of the received response.

According to various embodiments, the processor 480 may include one or more processors for controlling the operation of the electronic device 400. For example, the processor 480 may include a Communication Processor (CP), an Application Processor (AP), an interface (e.g., a General Purpose Input/Output (GPIO)), an internal memory, and the like as separate components, or these components may be integrated in one or more Integrated Circuits (ICs). According to an embodiment, the AP may perform several functions for the electronic device 400 by executing various software programs, and the CP may process and control voice communication and data communication. The processor 480 may execute a software module (e.g., an instruction set) stored in the memory 450 and thus perform various specific functions corresponding to the module.

In various embodiments, the processor 480 may control an operation of a hardware module such as the audio processor 440, the interface 460, the display 431, the camera module 470, or the like. An operation of controlling (or processing) the processor 480 will be described in detail with reference to drawings described below according to various embodiments of the disclosure.

According to various embodiments, the processor 480 may be implemented with one or more processors for controlling the operation of the electronic device 400 according to various embodiments of the disclosure by executing one or more programs stored in the memory 450. According to various embodiments, the processor 480 may be electrically or operatively coupled to the display 431 and memory 450 of the electronic device 400.

The power supplier 490 may supply power required for an operation of each component by receiving external power and internal power under the control of the processor 480. In various embodiments, the power supplier 490 may supply or turn on/off power to the wireless communication unit 410, the display 431, the camera module 470, or the like under the control of the processor 480. According to various embodiments, the power supplier 490 may include, for example, a battery control circuit. For example, the power supplier 490 may include a battery (e.g., a rechargeable battery and/or a solar battery), a battery remaining amount measurement circuit (e.g., a fuel gauge), a Power Management Integrated Circuit (PMIC), a charging circuit, a voltage raising circuit (e.g., a booster circuit), or the like.

Figure 5A:
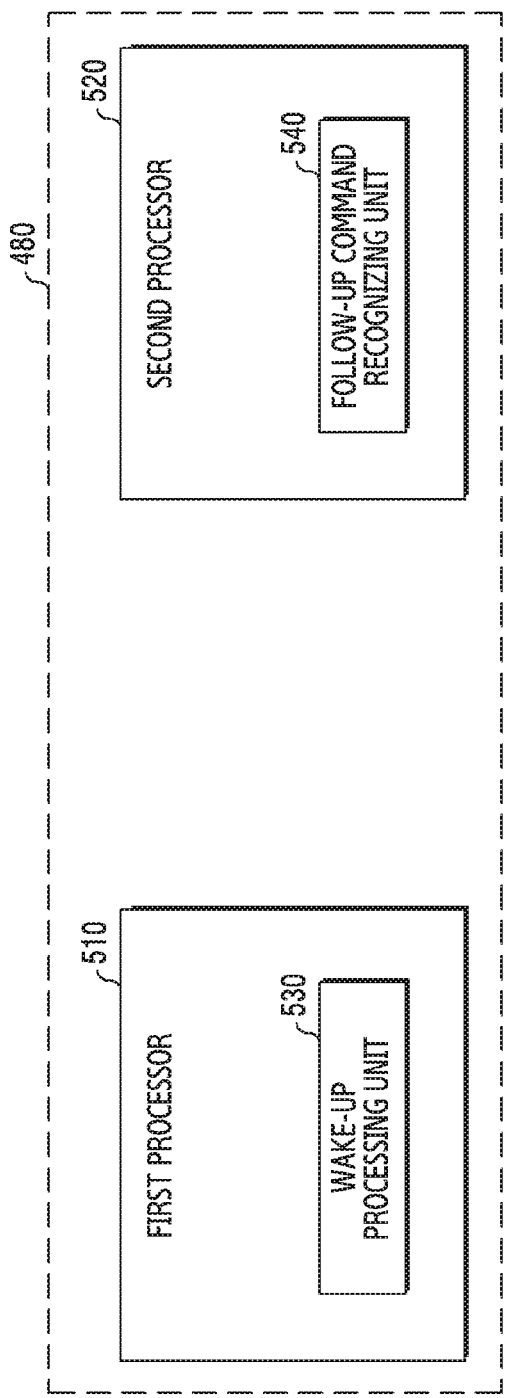
Figure 5C:
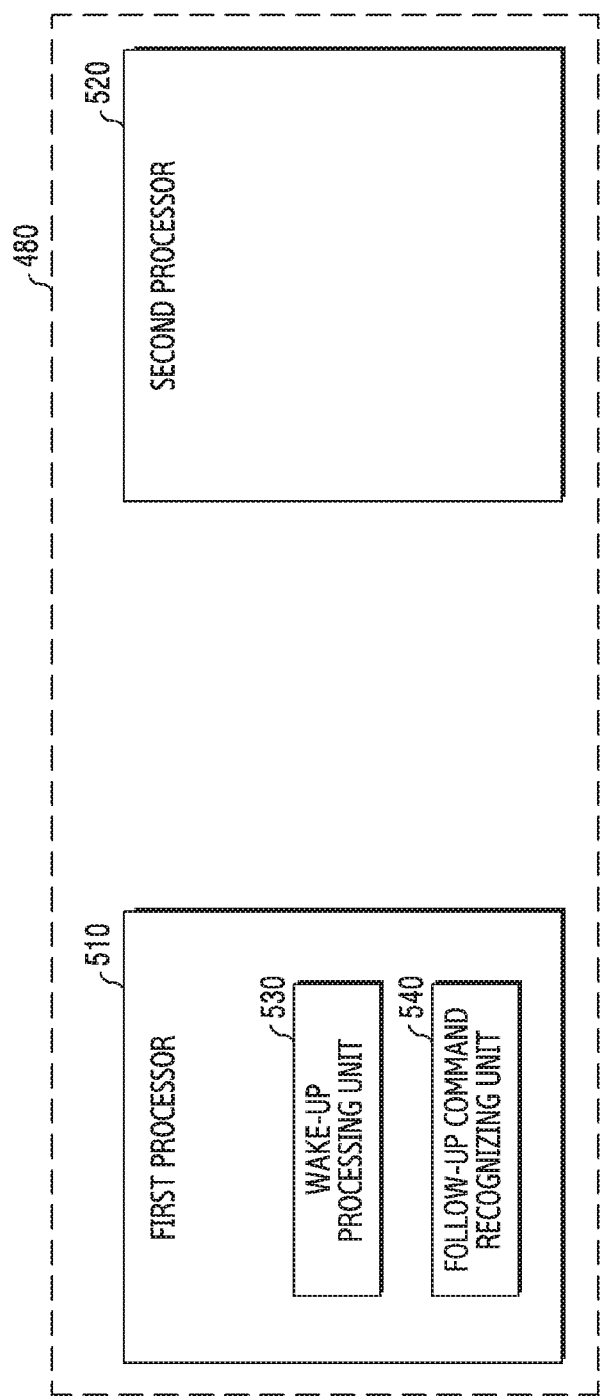

FIG. 5A, FIG. 5B, and FIG. 5C illustrate an example of implementing a component for processing a voice command in an electronic device according to various embodiments of the disclosure.

Referring to FIG. 5A, FIG. 5B, and FIG. 5C, FIG. 5A, FIG. 5B, and FIG. 5C may show an example of implementing a processor for processing an operation related to voice command processing in the electronic device 400 according to various embodiments. For example, in various embodiments, the processor 480 may include a first processor 510 related to recognition of a voice call command and a second processor 520 related to recognition of a voice after wake-up (e.g., a follow-up command) and processing of an overall operation related to the voice command.

As shown in FIG. 5A, according to various embodiments, the first processor 510 may include a module for recognizing a voice call command in a state where the electronic device 400 is in a sleep state or an operating state. According to an embodiment, the first processor 510 may include a wake-up processing unit 530 (e.g., a wake-up engine).

According to various embodiments, the second processor 520 may wake up in response to detection of the wake-up by using the voice call command of the first processor 510. The second processor 520 may include a module for performing voice recognition after the wake-up is achieved by using the first processor 510. According to an embodiment, the second processor 520 may include a follow-up command recognizing unit 540 (e.g., a voice recognition engine, an Automatic Speech Recognition (ASR) engine).

According to various embodiments, the first processor 510 may be configured in an active state to be able to recognize the voice call command, and the second processor 520 may wake up by using the first processor 510, on the basis of detection of the voice call command of the first processor 510.

As shown in FIG. 5B, according to various embodiments, the first processor 510 may recognize the voice call command on the basis of the wake-up processing unit 530. The second processor 520 may process an operation related to the voice command, and the electronic device 400 may additionally include a chip (e.g., the follow-up command recognizing unit 540) to recognize a follow-up command.

According to various embodiments, the follow-up command recognizing unit 540 may operate to recognize the follow-up command by waking up on the basis of the voice call command recognition of the first processor 510 (e.g., the wake-up processing unit 530). The second processor 520 may wake up by using the first processor 510 or the follow-up command recognizing unit 540 to process an operation related to the voice command. According to an embodiment, the second processor 520 may wake up in sequence or in parallel with the wake-up of the follow-up command recognizing unit 540. The second processor 520 may have the same or similar structure as the processor 210 of FIG. 2 or the processor 480 of FIG. 4. According to an embodiment, the second processor 520 may be implemented with an Application Processor (AP).

For example, the processor 480 may be implemented with the first processor 510 (e.g., the wake-up processing unit 530) for recognizing the voice call command, a third processor (e.g., the follow-up command recognizing unit 540) for recognizing the follow-up command, and the second processor 520 for overall processing related to the follow-up command. According to an embodiment, the first processor 510 and the follow-up command recognizing unit 540 may be implemented with an additional chip (e.g., an wake-up engine, an ASR engine) capable of processing an operation related to voice recognition (e.g., a voice call command, a follow-up command), and the second processor 520 may process an operation related to execution of a function corresponding to the voice command on the basis of recognition of the voice command.

Although not shown, according to various embodiments, the second processor 520 may include a score processing unit (not shown) for calculating a recognition score for a voice call command, and a shared processing unit (not shown) for sharing the score with an external device (e.g., a different electronic device, a server), a command decision unit (not shown) for determining (or deciding) whether to execute the voice command on the basis of collected information (e.g., a score, a voice recognition result, etc.).

As shown in FIG. 5C, according to various embodiments, functions of the first processor 510 for recognizing the voice call command and the second processor 520 for recognizing the follow-up command may be implemented by one processor. For example, the first processor 510 may include the wake-up processing unit 530 and the follow-up command recognizing unit 540. The second processor 520 may process an operation related to the voice command after waking up on the basis of the first processor 510.

Although not shown, according to various embodiments, it can be implemented to recognize the voice call command and the follow-up command by using one voice recognition engine (e.g., the first processor 510 or the wake-up processing unit 530), instead of additionally implementing (or adding) the follow-up command recognizing unit 540 for recognizing the follow-up command.

According to various embodiments, the aforementioned various implementations of the first processor 510 for recognizing the voice call command and the second processor 520 for recognizing the follow-up command after waking up on the basis of recognition of the voice call command of the first processor 510 may be divided or integrated according to a device type (or feature) of the electronic device 400. For example, according to a device type based on power consumption, the first processor 510 and the second processor 520 may be implemented independently or may be implemented in a form of one chip.

According to an embodiment, if the electronic device 400 is a device to which power is always connected such as a refrigerator, an air conditioner, a television, or the like, it can be implemented by a single processor without having to add a separate chip (e.g., the second processor 520) for processing the follow-up command.

According to an embodiment, if the electronic device 400 is a device which uses a high-capacity battery such as an automotive infotainment device, it can be implemented by a single processor without having to add a separate chip for processing the follow-up command.

According to an embodiment, if the electronic device 400 is a device which uses a low-power battery such as a smart phone, a watch, a Bluetooth speaker, or the like, a low-power chip (e.g., the second processor 520) capable of recognizing a command may be added in addition to the first processor 510. Alternatively, according to various embodiments, the electronic device 400 may be designed such that both the voice call command and the command can be recognized while using one low-power chip (e.g., the first processor 510 or the second processor 520).

Figure 6:
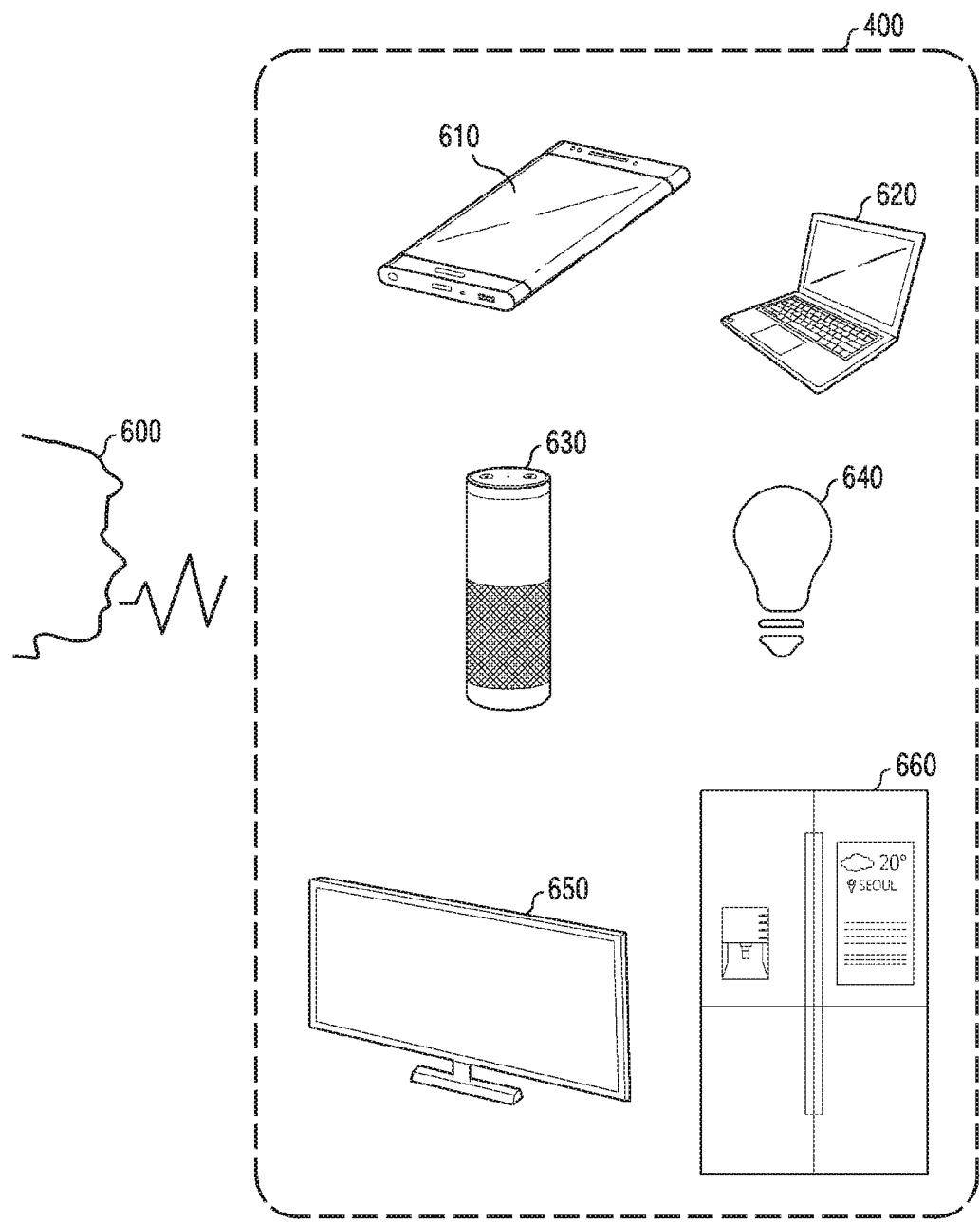
FIG. 6 illustrates an example of an electronic device according to various embodiments of the disclosure.

FIG. 6 illustrates an example of an electronic device according to various embodiments of the disclosure.

Referring to FIG. 6, in various embodiments, the electronic device 400 may include various devices having a component related to voice recognition and a microphone. In various embodiments, the electronic device 400 may include various types of devices capable of executing a function related to a voice command by receiving a voice input based on user's utterance through the microphone. For example, the electronic device 400 may include a smartphone 610, a computer 620 (e.g., a personal computer, a notebook, etc.), a Bluetooth speaker 630, an IoT device 640, a television 650, a refrigerator 660, or the like. Although not shown, the electronic device 400 according to various embodiments may be implemented by using various devices such as a tablet PC, an automotive infotainment device, a washing machine, an air conditioner, or the like, in addition to the aforementioned structure.

According to various embodiments, the plurality of electronic devices 610, 620, 630, 640, 650, and 660 may be registered (or set) with the same or different voice call command. In various embodiments, a case where the same voice call command is set in the plurality of electronic devices 610, 620, 630, 640, 650, and 660 will be described for example. According to an embodiment, the plurality of electronic devices 610, 620, 630, 640, 650, and 660 may be set with a specific wakeup word such as "hi", "hello", "hi, ABC", or the like. In various embodiments, "ABC" may represent, for example, a name of an electronic device (or an agent of an electronic device (or an Artificial Intelligence (AI)). For example, it may represent a name given such as galaxy or the like.

According to various embodiments, the electronic devices 610, 620, 630, 640, 650, and 660 may be set to a state capable of recognizing a user's voice call command. For example, the electronic devices 610, 620, 630, 640, 650, and 660 may be activated in a state of waiting for reception of the voice command by waking up substantially simultaneously on the basis of the user's voice call command. According to an embodiment, the electronic devices 610, 620, 630, 640, 650, and 660 may be in a state of receiving an audio input via a microphone, and may detect a voice call command by using an wake-up engine (e.g., the first processor 510) from the audio input. A voice recognition engine (e.g., the second processor 520) may wake up by using the wake-up engine. The voice recognition engine may receive a voice signal (or a voice command) for utterance of a user 600 according to the wake-up, and may perform voice recognition.

According to various embodiments, the electronic devices 610, 620, 630, 640, 650, and 660 may be set as one group on the basis of an account of the user 600. For example, as exemplified in Table 1 below, the electronic devices 610, 620, 630, 640, 650, and 660 may be grouped with the same account (e.g., samsung@samsung.com). Information related to the account and grouping of the electronic devices 610, 620, 630, 640, 650 and 660 may be registered in advance in the electronic devices 610, 620, 630, 640, 650, and 660 and/or a server (e.g., a Samsung server, a cloud server, etc.) as information related to the voice command processing. For example, the related information (hereinafter, service information) may be registered by including an account, device information (category), a score, a domain, or the like.

TABLE 1

| Account | Category | Name (nickname, device identifier) | Score | Domain (command) |
|---------|----------|-----|-------|------------------|
| First account | Phone | Galaxy | XXX | phone message music . . . |
|  | TV | Bordeaux | XXX | channel volume music . . . |
|  | Refrigerator | Zipel | XXX | recipe temperature control weather . . . |
|  | . . . | . . . | . . . | . . . |
| Second account | . . . | . . . | . . . | . . . |

According to various embodiments, the electronic devices 610, 620, 630, 640, 650, and 660 may be associated with the server and set to a standby state capable of receiving a response from the server. According to various embodiments, the electronic devices 610, 620, 630, 640, 650, and 660 may be grouped with the same account, coupled with one another, and set to the standby state capable of receiving a response from other electronic devices.

According to various embodiments, the electronic devices 610, 620, 630, 640, 650, and 660 may be identified based on unique names (e.g., a nickname, a device identifier) of the respective devices in the same account.

According to various embodiments, the electronic devices 610, 620, 630, 640, 650, and 660 may each include a domain list of domains that can be processed by themselves. For example, the electronic device 610, 620, 630, 640, 650, and 660 may be set with a domain list on the basis of executable functions. In various embodiments, a domain may represent a function or task which can be executed by the electronic devices 610, 620, 630, 640, 650, and 660 by using the voice command. According to an embodiment, in case of a phone, a domain of a phone, message, music, or the like may be set. According to an embodiment, in case of TV, a domain of a channel, volume, music, or the like, may be set. According to an embodiment, in case of a refrigerator, a domain of a recipe, temperature control, weather, or the like may be set.

According to various embodiments, the electronic devices 610, 620, 630, 640, 650, and 660 may calculate a recognition score for the voice call command in sequence or in parallel at a time of recognizing the voice call command. According to an embodiment, the electronic devices 610, 620, 630, 640, 650, and 660 may interwork with the server to transfer the recognized score to the server in a method of processing a voice command. According to an embodiment, the electronic devices 610, 620, 630, 640, 650, and 660 may transfer the recognized score to a different electronic device in the same account and share the score with each other, in a method in which the voice command is processed based on the electronic device without interworking with the server.

In various embodiments, the score represents a recognition rate by which the electronic devices 610, 620, 630, 640, 650, and 660 recognize the voice call command of the user 600, and the score may be calculated by considering various situations. For example, it may be assumed that the score is calculated as exemplified in Equation (1) below.

$$\begin{cases} \text{Success,} & \text{if } p(O|\lambda) > Th \\ \text{fail,} & \text{otherwise} \end{cases} \qquad [\text{Equation 1}]$$

Referring to Equation 1, "O" may denote an observation feature sequence, "λ" may denote a recognition model or a recognition word model, "Th" may denote a threshold, and "p(O|λ)" may denote a recognition score. According to an embodiment, for "λ" denoting the recognition model, a Hidden Markov Model (HMM), an Artificial Neural Network (ANN), or the like may be used.

According to various embodiments, the score may be calculated based on a variety of information (e.g., distance information, surrounding environment information (e.g., noise information), etc.) among the electronic devices 610, 620, 630, 640, 650, and 660. This will be explained with reference to drawings described below.

According to various embodiments, the electronic devices 610, 620, 630, 640, 650, and 660 may be grouped for each account of the user. For example, as shown in the example of Table 1, a phone, a TV, a refrigerator, and the like may be configured as one group by a first account, and other electronic devices may be configured as another group by a second account. According to various embodiments, the user may configure a voice call command different for each account to control electronic devices on a group basis.

According to various embodiments, each of the electronic devices 610, 620, 630, 640, 650, and 660 or the server may manage or use a device name (a nickname) of devices grouped for each account, an available domain list, score information for voice call command recognition, or the like during a session of the electronic devices associated with the same account. This will be explained in detail with reference to drawings described below.

In various embodiments, the electronic devices 610, 620, 630, 640, 650, and 660 may be coupled with one another. For example, in various embodiments, the electronic devices 610, 620, 630, 640, 650, and 660 may be coupled with other electronic devices on the basis of wireless communication (e.g., Bluetooth, Bluetooth Low Energy (BLE), WiFi, etc.). In various embodiments, the electronic devices 610, 620, 630, 640, 650, and 660 may wirelessly communicate with different electronic devices, and may exchange a variety of information (e.g., score information) related to the voice command processing with the different electronic devices. According to an embodiment, the electronic device 400 may transmit a score calculated by itself to a different electronic device, and may receive a score calculated by the different electronic device from the different electronic device. According to various embodiments, various examples related to processing of the voice command by the electronic device 400 to exchange the score will be described in detail with reference to the accompanying drawings.

According to various embodiments, the electronic devices 610, 620, 630, 640, 650, and 660 may be directly coupled through wireless communication. According to various embodiments, the electronic devices 610, 620, 630, 640, 650, and 660 may be coupled through an Access Point (AP) which is commonly accessed.

As described above, an electronic device according to various embodiments of the disclosure includes a microphone, a memory, and a processor operatively coupled to the microphone and the memory. The processor may be configured to wake up on the basis of detection of a voice call command, calculate a score related to recognition of the voice call command, share the score with an external device, decide whether to execute a voice command on the basis of the score, and process the voice command on the basis of the decision result.

According to various embodiments, the processor may be configured to include a first processor configured to recognize the voice call command and a second processor configured to wake up on the basis of detection of the voice call command of the first processor and to process voice recognition and an operation related to the voice command.

According to various embodiments, the processor may be configured to calculate the score, based at least in part on a distance to a user, an environment of the electronic device, a location of the electronic device, a domain of the electronic device, or a voice recognition rate.

According to various embodiments, the processor may be configured to transmit the calculated score to the external device, receive a response determined based on the score from the external device, and determine whether to process the voice command on the basis of the received response.

According to various embodiments, the processor may be configured to process the voice command if the response from the external device is a first response for instructing to process the voice command, and to transition to a standby state if the response from the external device is a second response for instructing to transition to the standby state.

According to various embodiments, the processor may be configured to output a related feedback if the response from the external device is a feedback response for requesting a user to select a device, and to acquire a device designation command of the user for the feedback.

According to various embodiments, the processor may be configured to decide a score of the electronic device and a score acquired by the external device, and if the score of the electronic device is high, determine the device as a target device for processing the voice command.

According to various embodiments, the processor may be configured to determine whether to process the voice command on the basis of a device designation command or a domain command.

According to various embodiments, the processor may be configured to determine a feedback target device on the basis of the score if a plurality of electronic devices include a related domain among devices grouped with the same account on the basis of the domain command, acquire device selection performed by a user on the basis of the determined feedback target device, and determine an electronic device corresponding to the device selection performed by the user as a target device for executing a voice command.

According to various embodiments, the processor may be configured to acquire the determination of the feedback target device and the determination of the target device from the external device.

According to various embodiments, the external device may be configured to determine a target device for executing the voice command, based at least in part on a score of electronic devices grouped with the same account, a device designation command, or a domain command, transmit a first response for instructing to process the voice command to the determined target device, and transmit a second response for instructing a different electronic device other than the target device among the electronic devices to transition to a standby state. The processor may be configured to process the voice command on the basis of receiving of the first response from the external device, or transition to the standby state on the basis of receiving of the second response.

According to various embodiments, the voice command may be determined to be processed by any one of a plurality of electronic devices which wake up on the basis of the voice call command and which are grouped with the same account.

Figure 7:
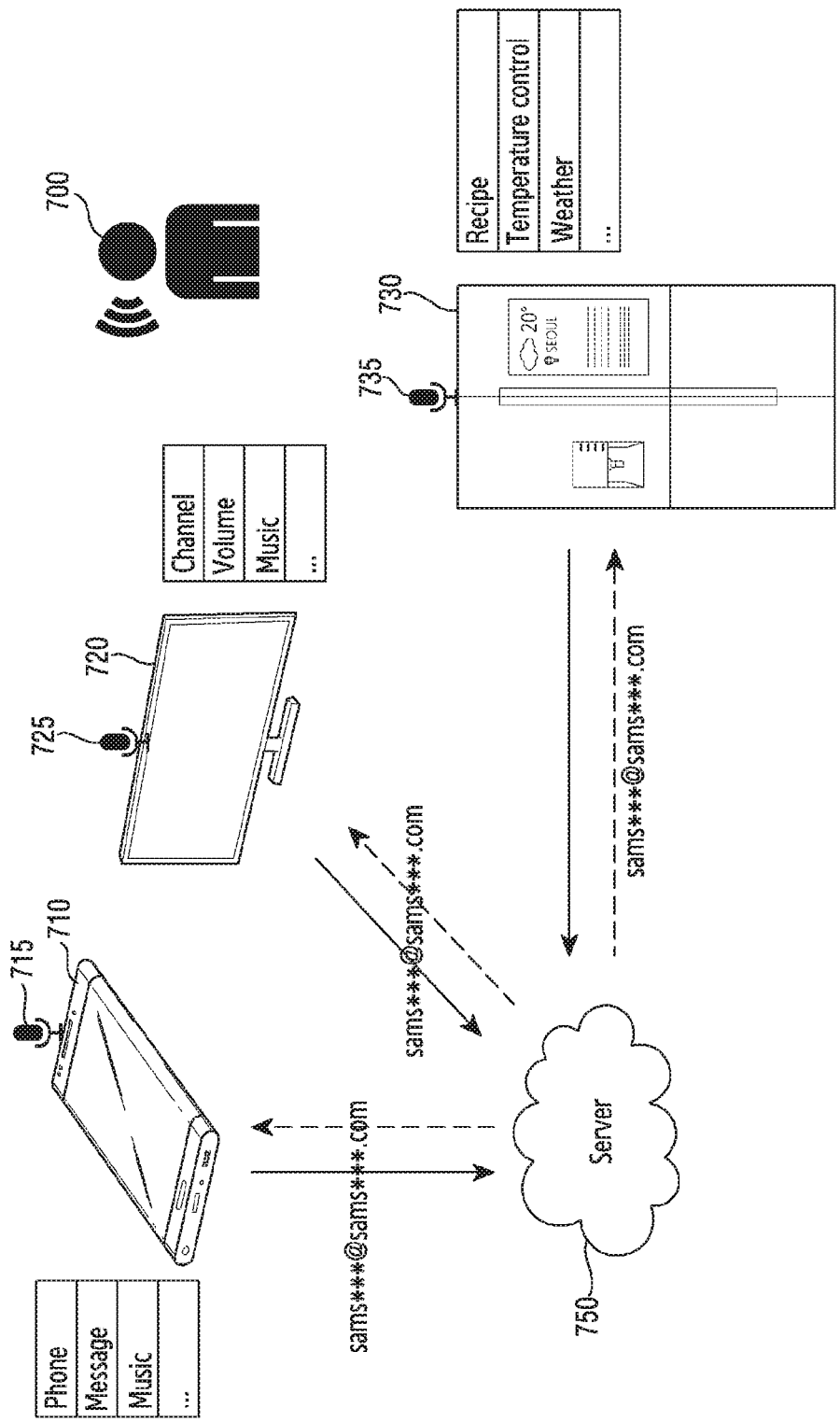
FIGS. 7 and 8 illustrate an example of an operation of processing a voice command in a system according to various embodiments of the disclosure.
Figure 8:
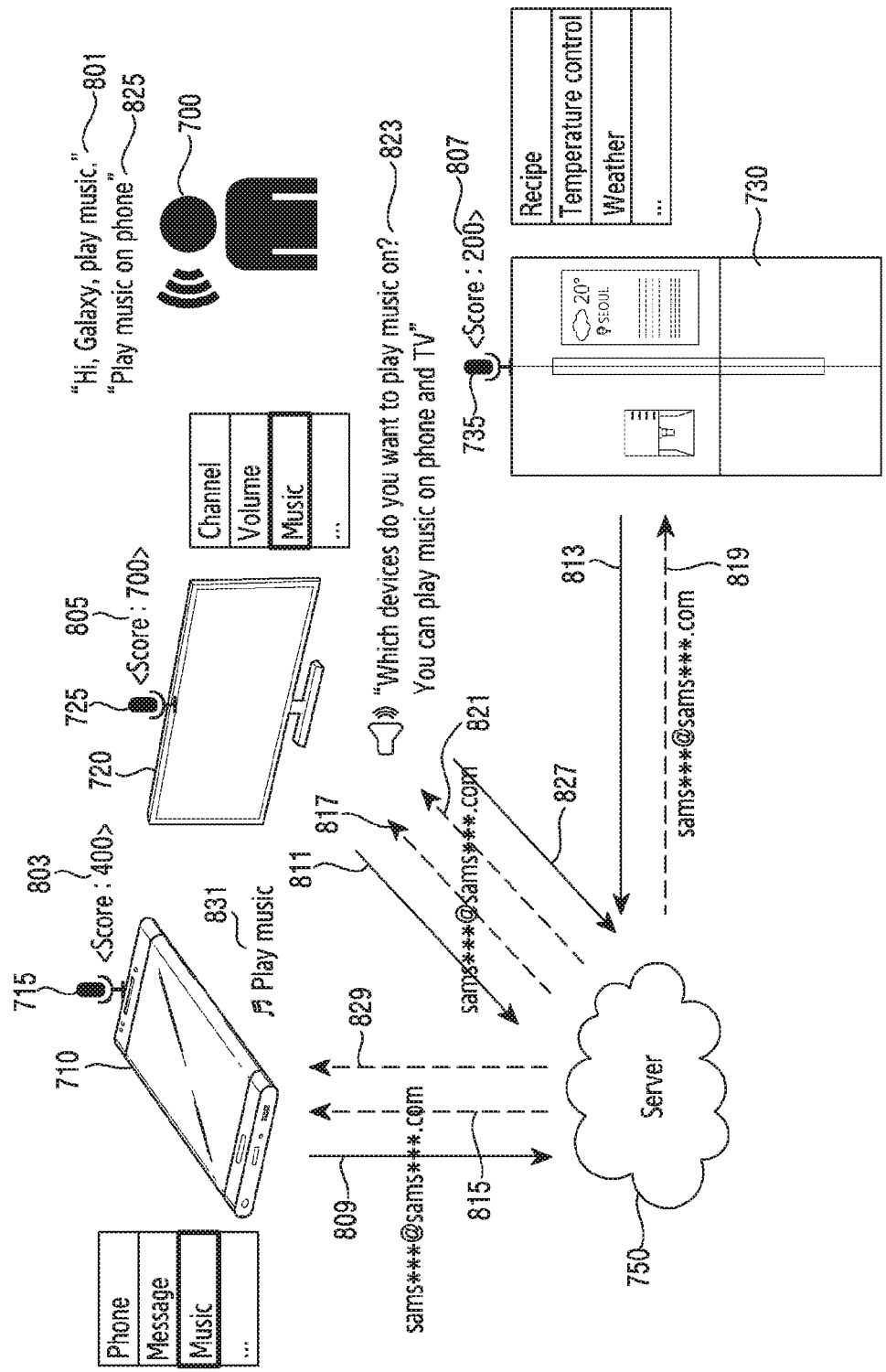
Figure 9:
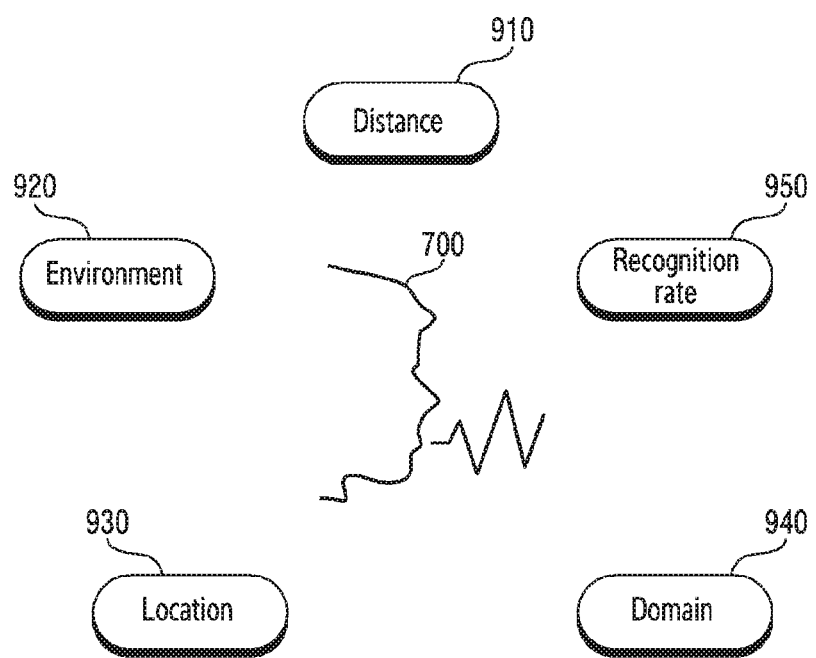
FIG. 9 illustrates an example of information considered when a score is calculated in an electronic device according to various embodiments.

FIG. 7, FIG. 8, and FIG. 9 illustrate an example of an operation of processing a voice command in a system according to various embodiments of the disclosure.

As shown in FIG. 7 and FIG. 8, a first electronic device 710 (e.g., a phone), a second electronic device 720 (e.g., a TV), and a third electronic device 730 (e.g., a refrigerator) may be grouped based on a specific account (e.g., samsung@samsung.com), and the same voice call command (e.g., hi, galaxy) may be registered. According to an embodiment, it may be assumed that the first electronic device 710 includes a domain list of a phone, a message, music, or the like, the second electronic device 720 includes a domain list of a channel, a volume, music, or the like, and the third electronic device 730 includes a domain list of a recipe, temperature control, weather, or the like. According to various embodiments, the first electronic device 710, the second electronic device 720, and the third electronic device 730 may respectively include microphones 715, 725, and 735, and may receive an audio input on the basis of utterance of a user 700 through the respective microphones 715, 725, and 735.

Referring to FIG. 7, the first electronic device 710, the second electronic device 720, and the third electronic device 730 may be coupled to a server 750 on the basis of the same account (e.g., samsung@samsung.com), and may be in a standby state capable of receiving a response from the server 750. According to various embodiments, the server 750 may include one or more control circuits for processing an operation related to voice command processing depending on various embodiments. According to an embodiment, the server 750 may include a processor corresponding to the processor 480 of the electronic device 400, and may include a voice recognition processing unit for allowing the electronic device to process voice recognition and related commands. According to an embodiment, the server 750 may include a database for storing a variety of information (e.g., account information, device information, domain list, etc.) for managing the electronic devices.

In a state shown in FIG. 7, the user 700 may utter a specific command to process a voice command in a specific electronic device. According to an embodiment, the user 700 may utter a configured voice call command for waking up the electronic device. According to an embodiment, the user 700 may utter the voice call command and a follow-up command (e.g., a command related to function execution). For example, the example of FIG. 8 may show a case where the user utters the voice call command and the follow-up command together.

Referring to FIG. 8, in operation 801, the user 700 may utter a command (e.g., a voice call command+a follow-up command) for wake-up and function execution in a corresponding electronic device to initiate a function (e.g., music playback) based on a voice command by a specific electronic device (e.g., a phone). According to an embodiment, the user may utter such as "Hi, Galaxy, play music." Herein,  "Hi, Galaxy" may correspond to the voice call command, and "play music" may correspond to the follow-up command.

According to various embodiments, a plurality of electronic devices (not shown) may receive an audio input based on utterance of the user 700 through the microphone (e.g., 715, 725, or 735). According to various embodiments, among the plurality of electronic devices, the first, second, and third electronic devices 710, 720, and 730 in which "Hi, Galaxy" is registered as the voice call command may wake up in response to the voice call command (e.g., Hi, Galaxy) of the user 700.

In operations 803, 805, and 807, the first, second, and third electronic devices 701, 720, and 730 may calculate a recognition score for the voice call command of the user 700 on the basis of the wake-up. The example of FIG. 8 may show a case where the first electronic device 710 calculates a score "400", the second electronic device 720 calculates a score "700", and the third electronic device 730 calculates a score "200". According to various embodiments, the score may be calculated in the same manner as explained with reference to the aforementioned Equation 1. In addition, the score may be calculated by considering a variety of information as shown in the example of FIG. 9 described below.

FIG. 9 illustrates an example of information considered when a score is calculated in an electronic device according to various embodiments.

Referring to FIG. 9, the electronic device 400 may calculate a score by considering a distance 910 to the user 700, an environment 920 (e.g., a noise, etc.) of the electronic device 400, a location 930 (e.g., a spatial or geographical location) of the electronic device 400, a domain 940 of the electronic device 400, a recognition rate 950, or the like.

According to various embodiments, the first electronic device 710, the second electronic device 720, and the third electronic device 730 may update information (e.g., service information) related to voice command processing exemplified in Table 1 above on the basis of the score calculation as shown in the example of Table 2 below. For example, the first electronic device 710, the second electronic device 720, and the third electronic device 730 may register the calculated score information in a score item.

TABLE 2

| Account | Category | Name (nickname, device identifier) | Score | Domain (command) |
|---|---|---|---|---|
| First account | Phone | Galaxy | 400 | phone message music ... |
|  | TV | Bordeaux | 700 | channel volume music ... |
|  | Refrigerator | Zipel | 200 | recipe temperature control weather ... |
|  | ... | ... | ... | ... |
| Second account | ... | ... | ... | ... |

In operations 809, 811, and 813, the first electronic device 710, the second electronic device 720, and the third electronic device 730 may transmit score information on the calculated score to the server 750. According to various embodiments, the first electronic device 710, the second electronic device 720, and the third electronic device 730 may transmit service information in which the score is input as shown in the example of Table 2 to the server 750. In the example of Table 2, each of the first electronic device 710, the second electronic device 720, and the third electronic device 730 may transmit only scores corresponding thereto as shown in the example of Table 3 below, and a form shown in Table 2 may be collected and managed by the server 750.

TABLE 3

| Account | Category | Name (nickname, device identifier) | Score | Domain (command) |
|---|---|---|---|---|
| First account | Phone | Galaxy | 400 | phone message music . . . |

According to various embodiments, the first electronic device 710, the second electronic device 720, and the third electronic device 730 may perform transmission to the server 750 by including only a name for device identification and a calculated score.

Upon receiving service information from the first electronic device 710, the second electronic device 720, and the third electronic device 730, the server 750 may decide a target device for executing a voice command on the basis of the score of the first electronic device 710, the second electronic device 720, and the third electronic device 730. For example, the server 750 may decide (or determine) an electronic device (e.g., the second electronic device 720) having a highest score, and may determine the electronic device as the target device for executing the voice command. The server 750 may determine that an electronic device (e.g., the first electronic device 710, the third electronic device 730) other than the decided electronic device (e.g., the second electronic device 720) is to wait.

According to various embodiments, the server 750 may identify devices grouped with the same account, on the basis of service information for each device as shown in the example of Table 2. According to an embodiment, the server 750 may pre-register and manage service information as shown in the example of Table 1, and may change the service information as shown in Table 2 in response to reception of score information. According to an embodiment, upon determining an execution target device, the server 750 may initiate the score information in the service information.

In operations 815, 817, and 819, the server 750 may transmit a response (e.g., a first response, a second response) to the first electronic device 710, the second electronic device 720, and the third electronic device 730 on the basis of a decision result. According to an embodiment, the server 750 may transmit the first response to an electronic device (e.g., the second electronic device 720) determined as the execution target device to execute a voice command. According to an embodiment, the server 750 may transmit the second response to an electronic device (e.g., the first electronic device 710, the third electronic device 730) other than the execution target device to transition to a standby state.

According to various embodiments, the first electronic device 710, the second electronic device 720, and the third electronic device 730 may receive a response from the server 750, and may perform a corresponding operation on the basis of the received response. According to an embodiment, the first electronic device 710 and the third electronic device 730 may transition to the standby state in response to reception of the second response. According to an embodiment, the second electronic device 720 may perform an operation related to a voice command based on user's utterance, in response to reception of the first response.

Meanwhile, according to various embodiments, if a follow-up command is included as shown in the example of FIG. 8, the first electronic device 710, the second electronic device 720, and the third electronic device 730 may perform transmission to the server 750 by including service information and the follow-up command.

Upon receiving the service information and the follow-up command from the first electronic device 710, the second electronic device 720, and the third electronic device 730, the server 750 may decide a device capable of executing a command corresponding to the follow-up command. According to an embodiment, if the follow-up command is included, the server 750 may determine a device for performing an operation with reference to device information (e.g., a device name or a nickname, a domain list) among the first electronic device 710, second electronic device 720, and third electronic device 730 of the same account.

According to various embodiments, the server 750 may determine the execution target device by preferentially considering whether a command is executable based on the follow-up command with a higher priority than the score of first electronic device 710, second electronic device 720, and third electronic device 730. For example, even if a specific electronic device is determined based on the score, the server 750 may determine a different electronic device capable of executing a command as a target device. For another example, if the follow-up command is included, the server 750 may determine an execution target device by preferentially identifying whether the command is executable based on the follow-up command.

According to various embodiments, if the follow-up command includes a device designation command, the server 750 may identify a device based on a designation command among the first, second, and third electronic devices 710, 720, and 730 grouped with the same account. For example, on the basis of device information (e.g., a device name (or a nickname), a device identifier, etc.) of devices grouped with the same account, the server 750 may identify an electronic device having corresponding device information, and may determine the identified electronic device as a target device for executing a voice command.

According to various embodiments, the server 750 may identify a domain list and thus identify one or more devices capable of executing a command among the first, second, and third electronic devices 710, 720, and 730 grouped with the same account.

According to an embodiment, if it is decided that there is one device capable of executing the command, the server 750 may transmit a first response for executing a voice command to a corresponding device capable of executing the command among the first, second, and third electronic devices 710, 720, and 730 grouped with the same account. The server 750 may transmit a second response for transitioning to the standby state to a different electronic device not capable of executing the command.

According to an embodiment, if a plurality of (e.g., at least two) devices are capable of executing the command, the server 750 may determine a feedback target device on the basis of a score of corresponding electronic devices. According to an embodiment, the server 750 may determine an electronic device having a highest score among the plurality of electronic devices capable of executing the command as a device for feedback of the user 700. For example, the server 750 may provide the feedback to the user 700 to determine (or select) an execution target device for executing a voice command by using Text To Speech (TTS) or other methods or the like. According to various embodiments, the server 750 may transmit to a feedback target device (e.g., the second electronic device 720) a third response (e.g., a feedback response) to request for feedback, and may transmit to a different electronic device (e.g., the first electronic device 710, the third electronic device 730) a different response to wait for a response. According to an embodiment, the server 750 may transmit to the different electronic device a second response to transition to the standby state.

For example, referring to FIG. 8, it may be assumed that a domain associated with a follow-up command, i.e., a command of "play music", is "music". As shown in FIG. 8, it may be assumed that a domain "music" is included in a domain list in the first electronic device 710 and the second electronic device 720. In this case, the server 750 may determine the second electronic device 720 having a higher score between the first electronic device 710 and the second electronic device 720 as a feedback target device. Upon determining the feedback target device, as shown in operation 821, the server 750 may transmit a command (e.g., a feedback command) to the second electronic device 720 determined as the feedback target device to request for designation (or selection) of the target device for executing the command. According to various embodiments, when the feedback command is provided, the server 750 may provide information on a device (e.g., the first electronic device 710, the second electronic device 720) that can be selected (or selectable) according to the feedback command.

Upon receiving the feedback command from the server 750, the second electronic device 720 may provide a feedback for requesting the user to designate a device in response to the feedback command. According to an embodiment, as shown in operation 823, the second electronic device 720 may request the user to select a device for executing a music playback command such as "On what device do you want to play music? You can play music on your phone and TV.". According to various embodiments, the second electronic device 720 may guide information on selectable devices on the basis of device information received from the server 750.

The user 700 may utter a voice for designating (selecting) a specific device in response to a device selection feedback of the second electronic device 720. According to an embodiment, as shown in operation 825, the user 700 may utter a voice for designating (selecting) the first electronic device 710 such as "phone" or "play music on phone" or the like. Upon detecting a voice input based on the utterance of the user 700, the second electronic device 720 may transmit the input voice information to the server 750.

Upon receiving a response (e.g., voice information) corresponding to the feedback command from the second electronic device 720, the server 750 may decide an execution target device on the basis of the received response. According to an embodiment, the server 750 may analyze the received response to determine the first electronic device 710 as a final execution target device on the basis of the received response between the first and second electronic devices 710 and 720 capable of executing a function (e.g., music playback) based on the voice command.

Upon determining the execution target device, the server 750 may transmit a first response to the determined execution target device to instruct to execute the voice command (e.g., music playback). According to an embodiment, as shown in operation 829, the server 750 may transmit the first response to the first electronic device 710. According to various embodiments, the server 750 may transmit a second response to an electronic device (e.g., the second electronic device 720, the third electronic device 730) other than the execution target device to transition to the standby state. According to various embodiments, the second response may be transmitted in advance and thus the third electronic device 730 may be in the standby state. Therefore, the server 750 may transmit the second response to the second electronic device 720, and may not perform response transmission to the third electronic device 730.

The first electronic device 710 and the second electronic device 720 may receive a response from the server 750, and may perform a corresponding operation on the basis of the received response. According to an embodiment, the first electronic device 710 may perform a function (e.g., music playback) corresponding to the voice command as shown in operation 831 in response to reception of the first response. According to an embodiment, the second electronic device 720 may transition to the standby state in response to reception of the second response.

Figure 10:
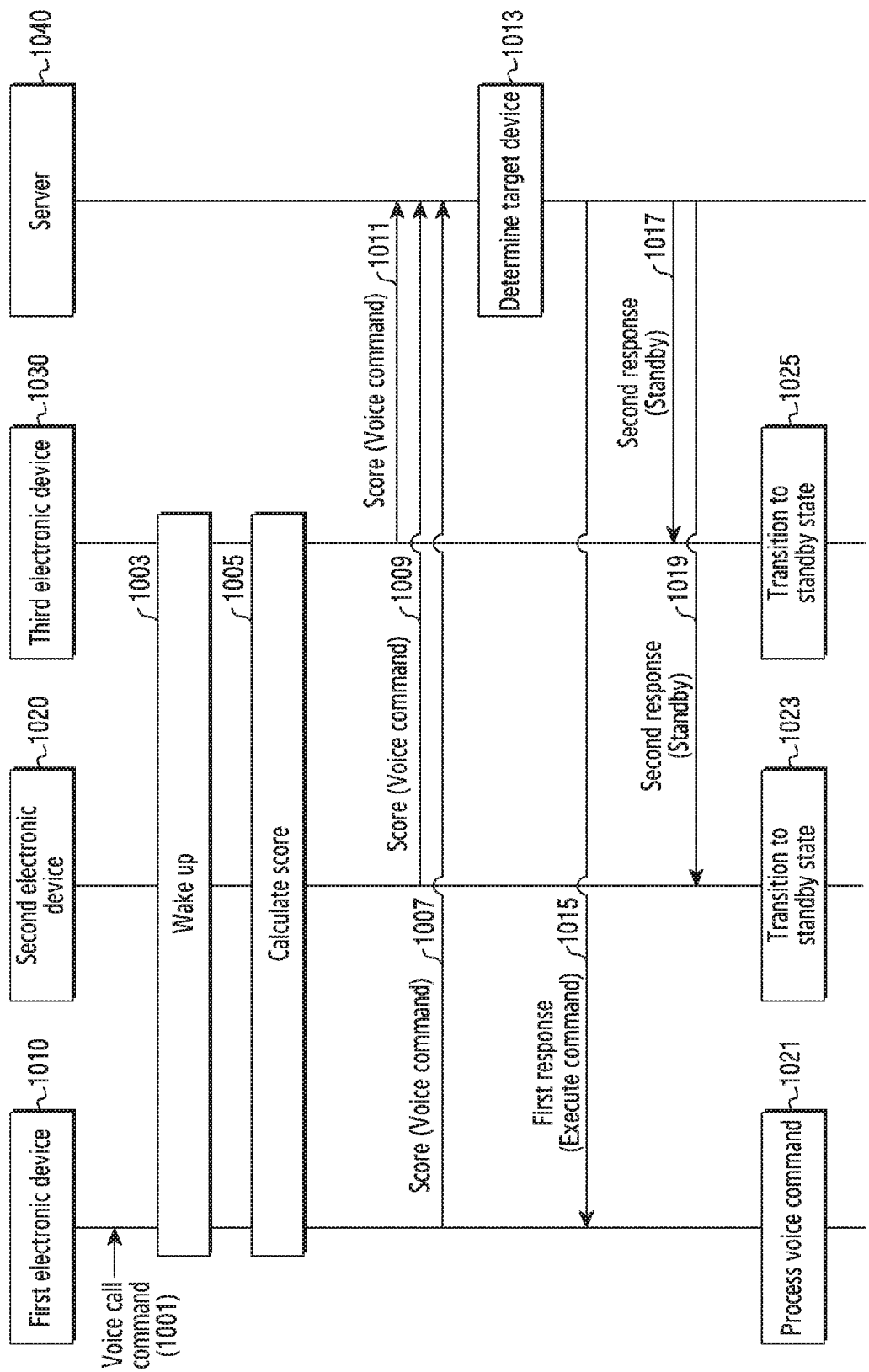
FIG. 10 illustrates an operation of processing a voice command in a system according to various embodiments of the disclosure.

FIG. 10 illustrates an operation of processing a voice command in a system according to various embodiments of the disclosure.

As shown in FIG. 10, a case shown in FIG. 10 may be as case where a first electronic device 1010, a second electronic device 1020, and a third electronic device 1030 are grouped based on a specific account, and the same voice call command is registered. In addition, FIG. 10 may show an example of processing a voice command by interworking with a server 1040.

Referring to FIG. 10, in operation 1001, a user may utter a voice call command so that a voice command is executed in a specific electronic device. According to various embodiments, the user may utter the voice call command and a follow-up command, and may separately utter the follow-up command after waking up the electronic device on the basis of the voice call command.

In operation 1003, the first electronic device 1010, the second electronic device 1020, and the third electronic device 1030 may wake up on the basis of the voice call command. According to various embodiments, the first electronic device 1010, the second electronic device 1020, and the third electronic device 1030 may simultaneously wake up within a specific time range in sequence or in parallel at a time of recognizing the voice call command. According to various embodiments, the first electronic device 1010, the second electronic device 1020, and the third electronic device 1030 may receive and recognize the voice call command of the user through a microphone.

In operation 1005, the first electronic device 1010, the second electronic device 1020, and the third electronic device 1030 may calculate a recognition score of the voice call command. In various embodiments, the first electronic device 1010, the second electronic device 1020, and the third electronic device 1030 may calculate a recognition score for the voice call command of the user on the basis of the wake-up caused by the voice call command.

In operations 1007, 1009, and 1011, the first electronic device 1010, the second electronic device 1020, and the third electronic device 1030 may transmit the calculated score to the server 1040. According to various embodiments, the first electronic device 1010, the second electronic device 1020, and the third electronic device 1030 may include and provide device information for identifying a device to the server 1040. According to an embodiment, the first electronic device 1010, the second electronic device 1020, and the third electronic device 1030 may provide service information including the score and device information to the server 1040. According to various embodiments, if another voice command (e.g., a follow-up command) is included in voice recognition, the first electronic device 1010, the second electronic device 1020, and the third electronic device 1030 may transmit service information to the server 1040 by including the voice command.

In operation 1013, upon receiving the service information from the first electronic device 1010, the second electronic device 1020, and the third electronic device 1030, the server 1040 may determine a target device for executing the voice command on the basis of the score of the first electronic device 1010, the second electronic device 1020, and the third electronic device 1030. For example, the server 1040 may decide (or determine) an electronic device having a highest score, and may determine the electronic device as the target device for executing the voice command. According to various embodiments, the server 1040 may determine that an electronic device other than the electronic device determined as the target device is to wait. According to an embodiment, FIG. 10 may show a case where the first electronic device 1010 has a highest score, and the server 1040 determines the first electronic device 1010 as the target device. According to various embodiments, the server 1040 may pre-store a variety of information related to the first electronic device 1010, the second electronic device 1020, and the third electronic device 1030, and may determine the target device on the basis of the stored variety of information. This will be described in detail with reference to the accompanying drawings.

In operations 1015, 1017, and 1019, the server 1040 may transmit a response (e.g., a first response, a second response) to the first electronic device 1010, the second electronic device 1020, and the third electronic device 1030 on the basis of a decision result. According to an embodiment, in operation 1015, the server 1040 may transmit a first response to the first electronic device 1010 determined as the target device to execute the voice command among the first electronic device 1010, the second electronic device 1020, and the third electronic device 1030. According to an embodiment, in operations 1017 and 1019, the server 1040 may transmit a second response to the second electronic device 1020 and third electronic device 1030, which are not selected as the target device, to transition to a standby state.

In operations 1021, 1023, and 1025, the first electronic device 1010, the second electronic device 1020, and the third electronic device 1030 may receive a response from the server 1040, and may perform a corresponding operation on the basis of the received response. According to an embodiment, in operation 1021, the first electronic device 1010 may operate to process the voice command in response to reception of the first response. For example, the first electronic device 1010 may operate to perform a related service based on voice recognition (e.g., processing of the voice command and executing of a function related to the voice command). According to an embodiment, in operations 1023 and 1025, the second electronic device 1020 and the third electronic device 1030 may operate to transition to the standby state in response to reception of the second response.

Figure 11:
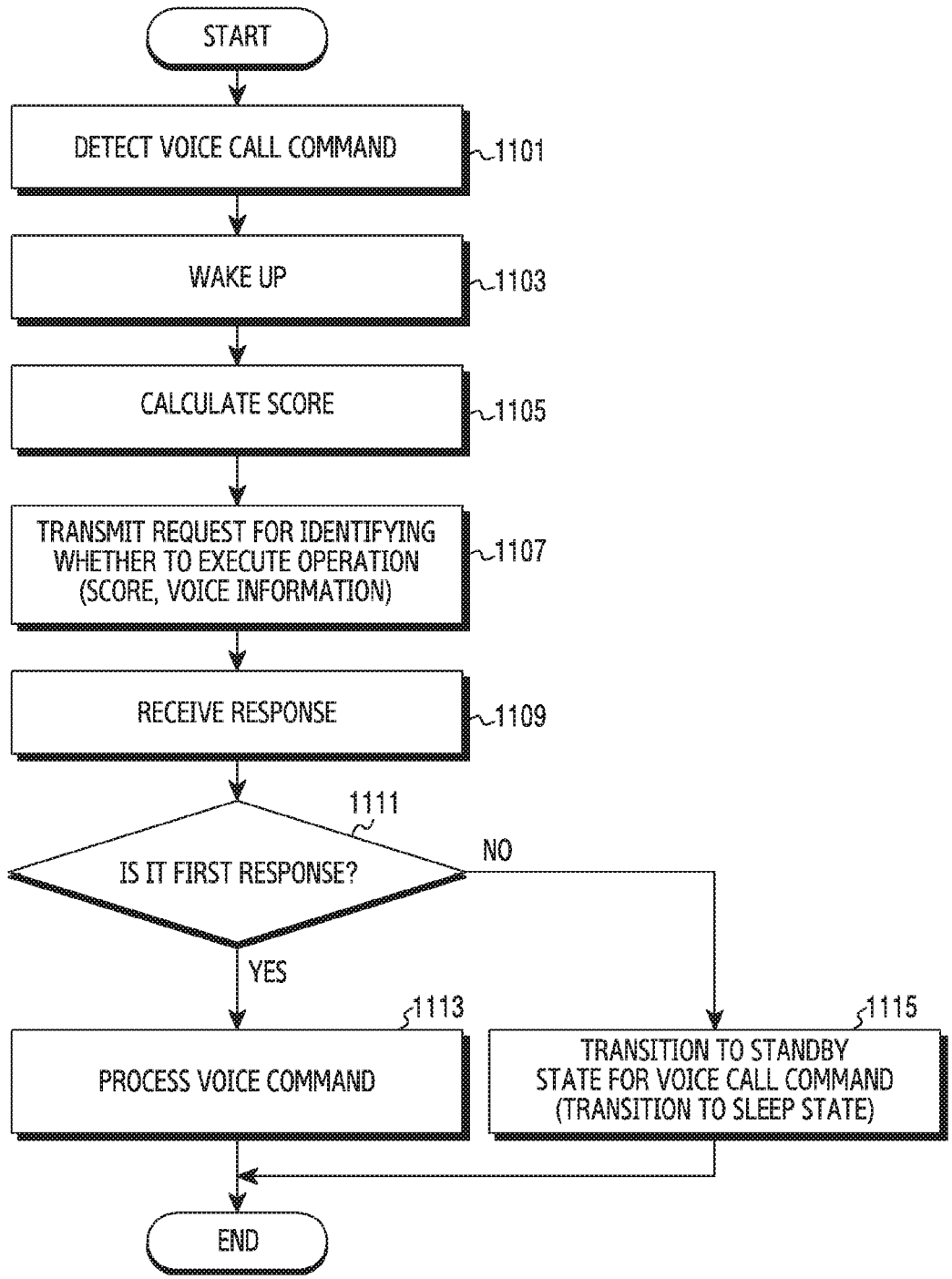
FIG. 11 is a flowchart illustrating an operation of processing a voice command in an electronic device according to various embodiment of the disclosure.

FIG. 11 is a flowchart illustrating an operation of processing a voice command in an electronic device according to various embodiment of the disclosure.

Referring to FIG. 11, in operation 1101, the processor 480 of the electronic device 400 may detect a voice call command. According to an embodiment, the electronic device 400 may recognize the voice call command through a microphone on the basis of a first processor (e.g., a wake-up processing unit, a wake-up engine) for recognizing the voice call command.

In operation 1103, the processor 480 may wake up in response to detection of the voice call command. According to an embodiment, the electronic device 400 may wake up a second processor (e.g., a follow-up command recognition unit, a voice recognition engine, a service control circuit), on the basis of voice call command detection of the first processor.

In operation 1105, the processor 480 may calculate a recognition score of the voice call command. According to an embodiment, the processor 480 may calculate a score by considering various situations, as explained with reference to Equation 1 and FIG. 9.

In operation 1107, the processor 480 may transmit to the server a request message for identifying whether to execute the voice command. According to an embodiment, upon calculating the score, the processor 480 may transmit service information including at least part of the calculated score information, device information, or a follow-up command to the server by using a configured communication interface (e.g., the wireless communication unit 410). According to various embodiments, the service information may include information for requesting the server to identify whether to execute the voice command.

In operation 1109, the processor 480 may receive from the server a response corresponding to a request for identifying whether to execute an operation.

In operation 1111, the processor 480 may decide whether the received response corresponds to a first response for instructing to initiate the voice command or a second response for instructing to transition to a standby state.

If it is decided in operation 1111 that the received response is the first response (YES in operation 1111), in operation 1113, the processor 480 may process the voice command. For example, the processor 480 may execute a voice recognition operation for user's utterance, and may process an operation related to execution of the related function.

If it is decided in operation 1111 that the received response is the second response (NO in operation 1111), in operation 1115, the processor 480 may transition to the standby state to wait for the voice call command. According to an embodiment, the processor 480 may allow the electronic device 400 to transition to a sleep state. For example, the electronic device 400 may allow a second processor to transition to the sleep state. The electronic device 400 in the sleep state may wait for the voice call command on the basis of the first processor, and may not execute the voice recognition operation for user's utterance caused by the second processor.

Figure 12:
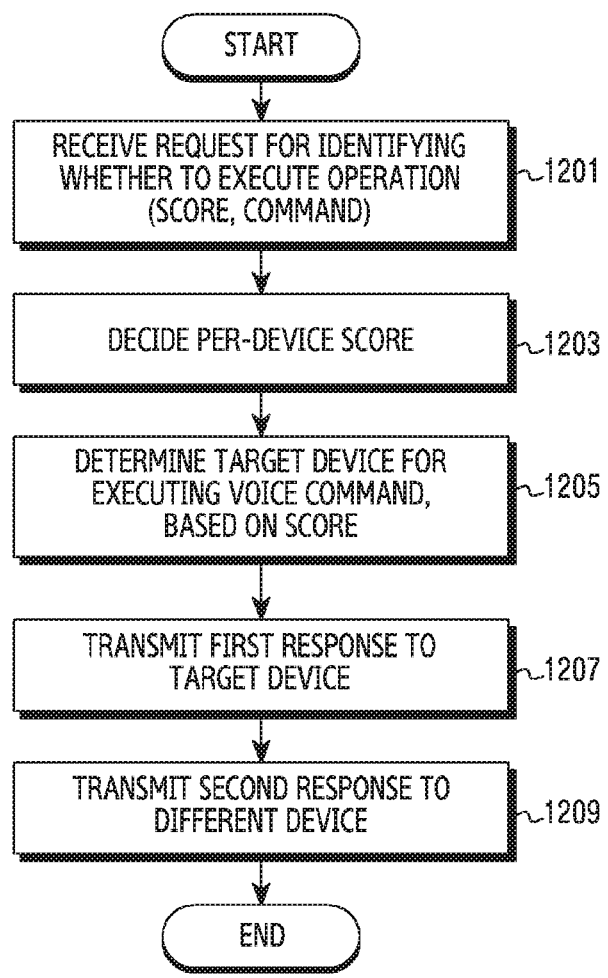
FIG. 12 is a flowchart illustrating an operation of processing a voice command in a server according to various embodiment of the disclosure.

FIG. 12 is a flowchart illustrating an operation of processing a voice command in a server according to various embodiment of the disclosure.

Referring to FIG. 12, in operation 1201, the server 750 (or a control circuit of the server 750) may receive a message (e.g., service information) to request for identifying whether to execute a voice command from at least one electronic device. According to various embodiments, the service information may include score information, device information, a follow-up command, or the like.

In operation 1203, the server 750 may decide a score for each device. According to an embodiment, upon receiving the service information from the first electronic device, the second electronic device, and the third electronic device, the server 750 may compare and decide a first score of the first electronic device, a second score of the second electronic device, and a third score of the third electronic device. According to various embodiments, the first electronic device, the second electronic device, and the third electronic device may be devices grouped with the same account.

In operation 1205, the server 750 may determine a target device for executing the voice command on the basis of the score. According to an embodiment, the server 750 may decide an electronic device having a highest score, and may determine the electronic device as the target device for executing the voice command. The server 750 may determine that an electronic device other than the electronic device determined as the target device is to wait.

In operation 1207, the server 750 may transmit a first response to a target device determined to execute a voice command. According to various embodiments, the first response may include a response for instructing the target device to execute the voice command.

In operation 1209, the server 750 may transmit a second response to a different device determined not to execute the voice command, for example, a different device determined to transition to a standby state. According to various embodiments, the second response may include a response for instructing the different device to transition to the standby state (or sleep state) for waiting for a voice call command.

In various embodiments, the order of operations 1207 and 1209 is shown for convenience of explanation, and is not limited to the order of FIG. 12. For example, operations 1207 and 1209 may be performed in sequence, in parallel, or in a reverse order.

Figure 13:
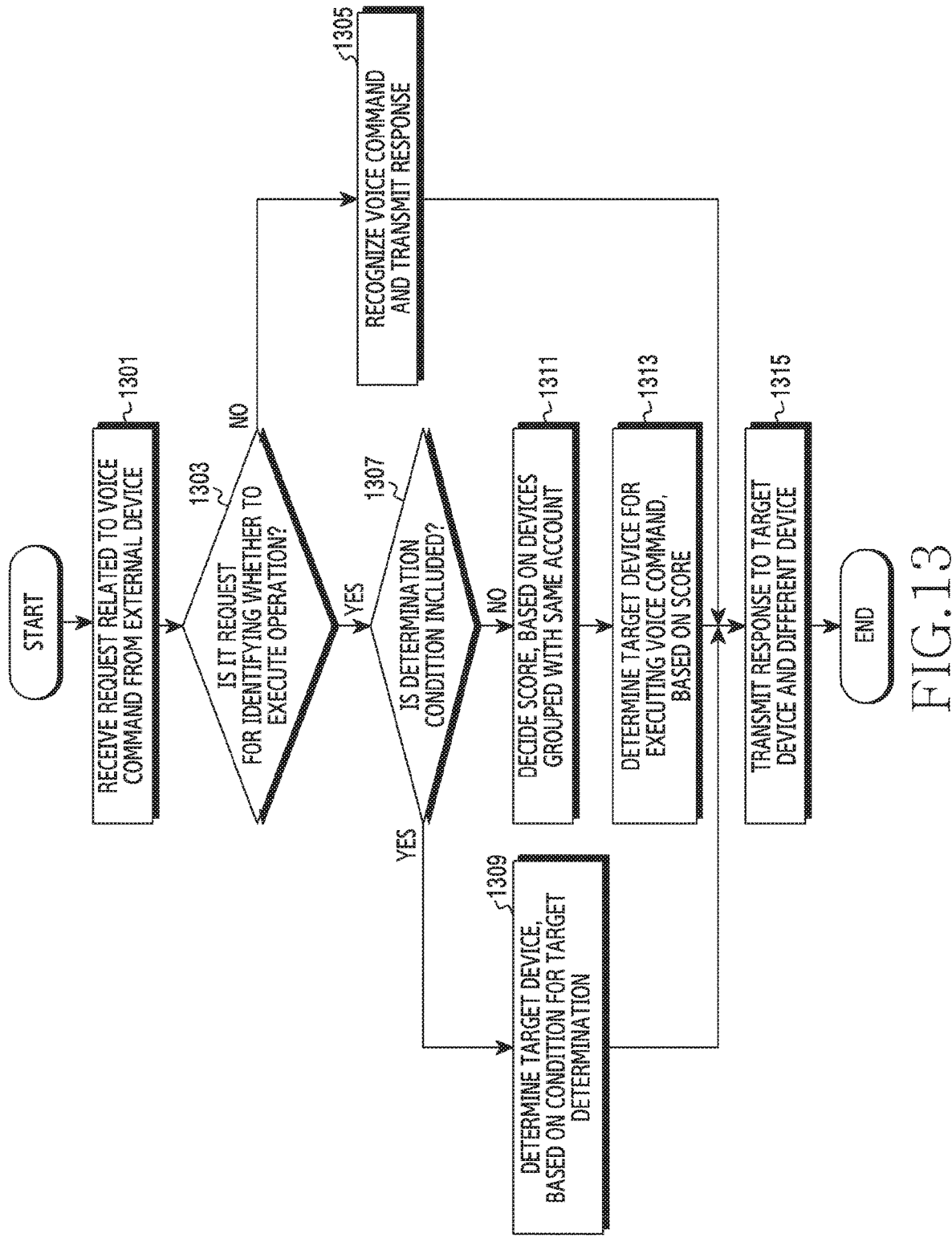
FIG. 13 is a flowchart illustrating an operation of processing a voice command in a server according to various embodiments of the disclosure.

FIG. 13 is a flowchart illustrating an operation of processing a voice command in a server according to various embodiments of the disclosure.

Referring to FIG. 13, in operation 1301, the server 750 (or a control circuit of the server 750) may receive a request related to a voice command from an external device. According to various embodiments, the external device may include a plurality of electronic devices.

In operation 1303, the server 750 may decide whether the request from the external device is a first request for identifying whether to execute a voice command or a second request for requesting for a result (or command) on voice recognition. According to an embodiment, the server 750 may identify a request category on the basis of parsing of a type (or format) (e.g., service information) of a request received from the external device, header information of a request message, wake-up related information included in the request message, or the like.

If it is decided as the second request in operation 1303 (NO in operation 1303), in operation 1305, the server 750 may recognize a voice command and transmit a response thereon to a corresponding external device.

If it is decided as the first request in operation 1303 (YES in operation 1303), in operation 1307m the server 750 may decide whether a determination condition to be considered to determine a target device is included in the first request (e.g., service information). According to various embodiments, the determination condition may include, for example, at least one of the number of devices which have transmitted the request, a device designation command (e.g., "phone", etc.), a domain command (e.g., "music playback", etc.), or the like. For example, when at least one follow-up command such as the device designation command and/or the domain command or the like is included in the first request, the server 750 may decide that the determination condition is included.

If it is decided in operation 1307 that the first request includes the determination condition (YES in operation 1307), in operation 1309, the server 750 may determine a target device on the basis of at least one condition for determining the target device for executing the voice command. A specific example for this will be described in detail with reference to FIG. 14.

If it is decided in operation 1307 that the first request does not include the determination condition (NO in operation 1307), in operation 1311, the server 750 may decide a score for each device on the basis of devices grouped with the same account.

In operation 1313, the server 750 may determine a target device for executing the voice command on the basis of the score. For example, as described above, the server 750 may determine an electronic device having a highest score as the target device among the electronic devices of the same account.

In operation 1315, the server 750 may transmit a different response to each of the target device and a different device. According to an embodiment, the server 750 may transmit a first response to instruct the target device to process a voice command and a second response to instruct the different device other than the target device to transition to a standby state.

Figure 14:
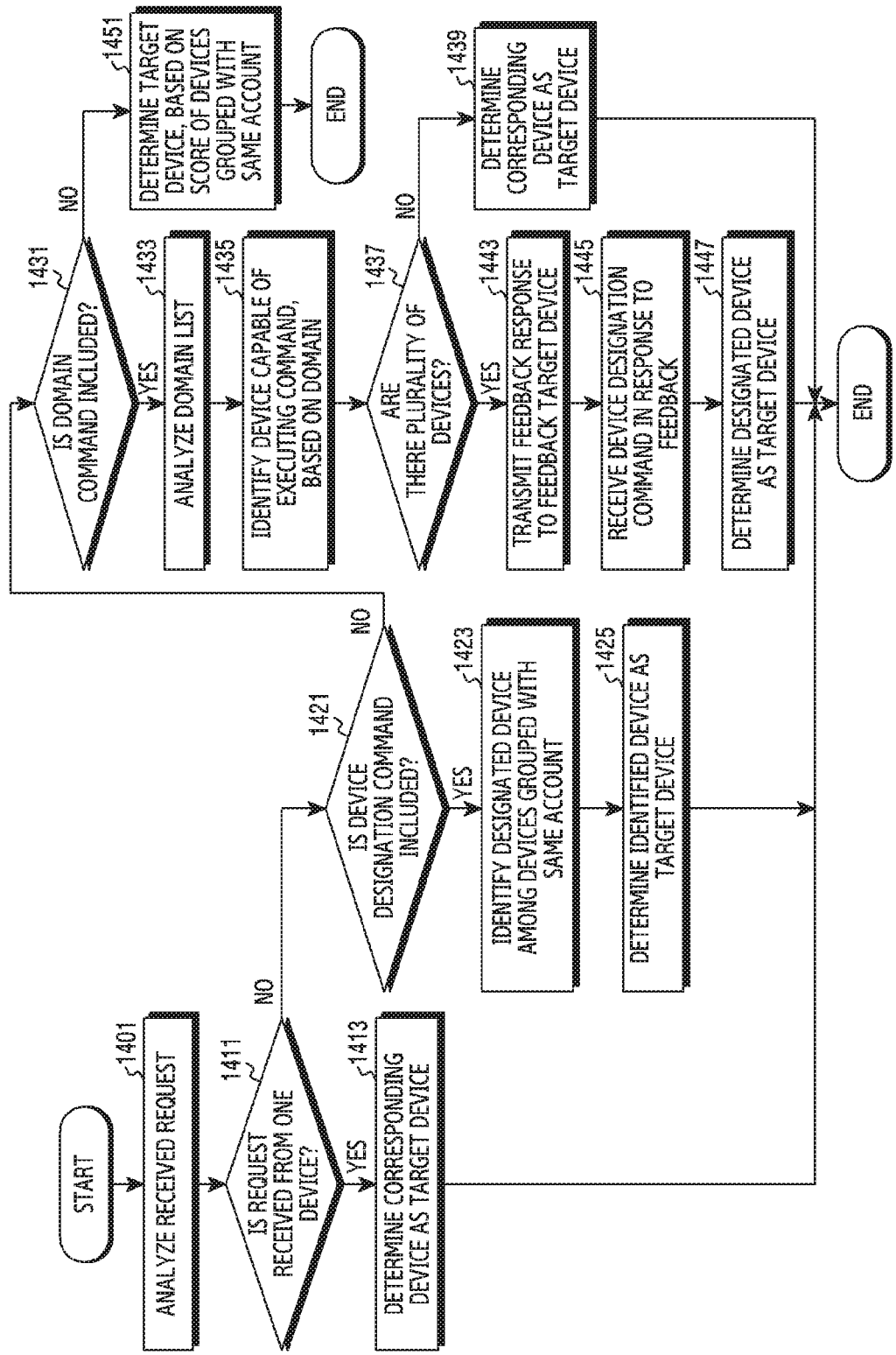
FIG. 14 is a flowchart illustrating an example of determining a target device for executing a voice command in a server according to various embodiments of the disclosure.

FIG. 14 is a flowchart illustrating an example of determining a target device for executing a voice command in a server according to various embodiments of the disclosure.

Referring to FIG. 14, in operation 1401, the server 750 (or a control circuit of the server 750) may analyze a request received from an external device. According to an embodiment, upon receiving a request (e.g., service information) for identifying whether to process the voice command from the external device, the server 750 may decide a determination condition to be considered to determine whether the request is received from one external device, whether a device designation command (e.g., "phone", etc.) is included, whether a domain command (e.g., "music playback", etc.) is included, or the like. According to various embodiments, the request may include one or more determination conditions.

In operation 1411, the server 750 may decide whether a request is received from one external device. For example, the server 750 may decide whether there is a request from a different device belonging to the same account as that of a corresponding external device.

If it is decided in operation 1411 that the request is received from one external device (YES in operation 1411), in operation 1413, the server 750 may determine a corresponding external device as a target device for executing a voice command.

If it is decided in operation 1411 that the request is received from the plurality of external devices of the same account (NO in operation 1411), in operation 1421, the server 750 may decide whether a device designated command is included.

If it is decided in operation 1421 that the request includes the device designation command (YES in operation 1421), the server 750 may identify a designated device among the devices grouped with the same account. For example, the server 750 may identify a device based on the device designation command among the devices grouped with the same account. According to an embodiment, on the basis of device information (e.g., a device name (or a nickname), a device identifier, etc.) of the devices grouped with the same account, the server 750 may identify an electronic device having corresponding device information.

In operation 1425, the server 750 may determine the identified device (e.g., a device designated by a user) as the target device for executing the voice command.

If it is decided in operation 1421 that the device designation command is not included (NO in operation 1421), in operation 1431, the server 750 may decide whether the request includes a domain command.

If it is decided in operation 1431 that the request does not include the domain command (NO in operation 1431), in operation 1451, the server 750 may determine the target device for executing the voice command on the basis of scores of devices grouped with the same account. For example, an external device having a highest score may be determined as the target device on the basis of the score.

If it is decided in operation 1431 that the request includes the domain command (YES in operation 1431), in operation 1433, the server 750 may analyze the domain list.

In operation 1435, the server 750 may identify one or more devices capable of executing a command (function) based on a domain command among devices grouped with the same account, on the basis of an analysis result of a domain list.

In operation 1437, the server 750 may decide whether there are a plurality of devices capable of executing the command. For example, it may be decided whether there are devices having the same domain among the devices grouped with the same account.

If it is decided in operation 1437 that there is one device capable of executing the command (NO in operation 1437), in operation 1439, the server 750 may determine a corresponding device capable of executing a command as the target device for executing the voice command among the devices grouped with the same account.

If it is decided in operation 1437 that the plurality of devices are capable of executing the command (YES in operation 1437), in operation 1441, the server 750 may determine a feedback target device on the basis of a score of corresponding electronic devices. According to an embodiment, the server 750 may determine an electronic device having a highest score among the plurality of electronic devices capable of executing the command as a device for feedback of the user. For example, the server 750 may provide the feedback to the user to determine (or select) a target device for executing a voice command by using Text To Speech (TTS) or other methods or the like. According to various embodiments, when providing the feedback command, the server 750 may transmit information (e.g., a device name (or a nickname)) for a device that can be selected based on the feedback command.

In operation 1443, the server 750 may transmit a feedback response (e.g., a third response) to a feedback target device. According to an embodiment, the server 750 may transmit a different response to wait for a response to remaining devices other than the feedback target device.

In operation 1445, the server 750 may receive a device designation command corresponding to a feedback from the feedback target device.

In operation 1447, the server 750 may determine a designated device among devices grouped with the same account on the basis of the received device designation command, as a target device for executing a voice command.

Figure 15:
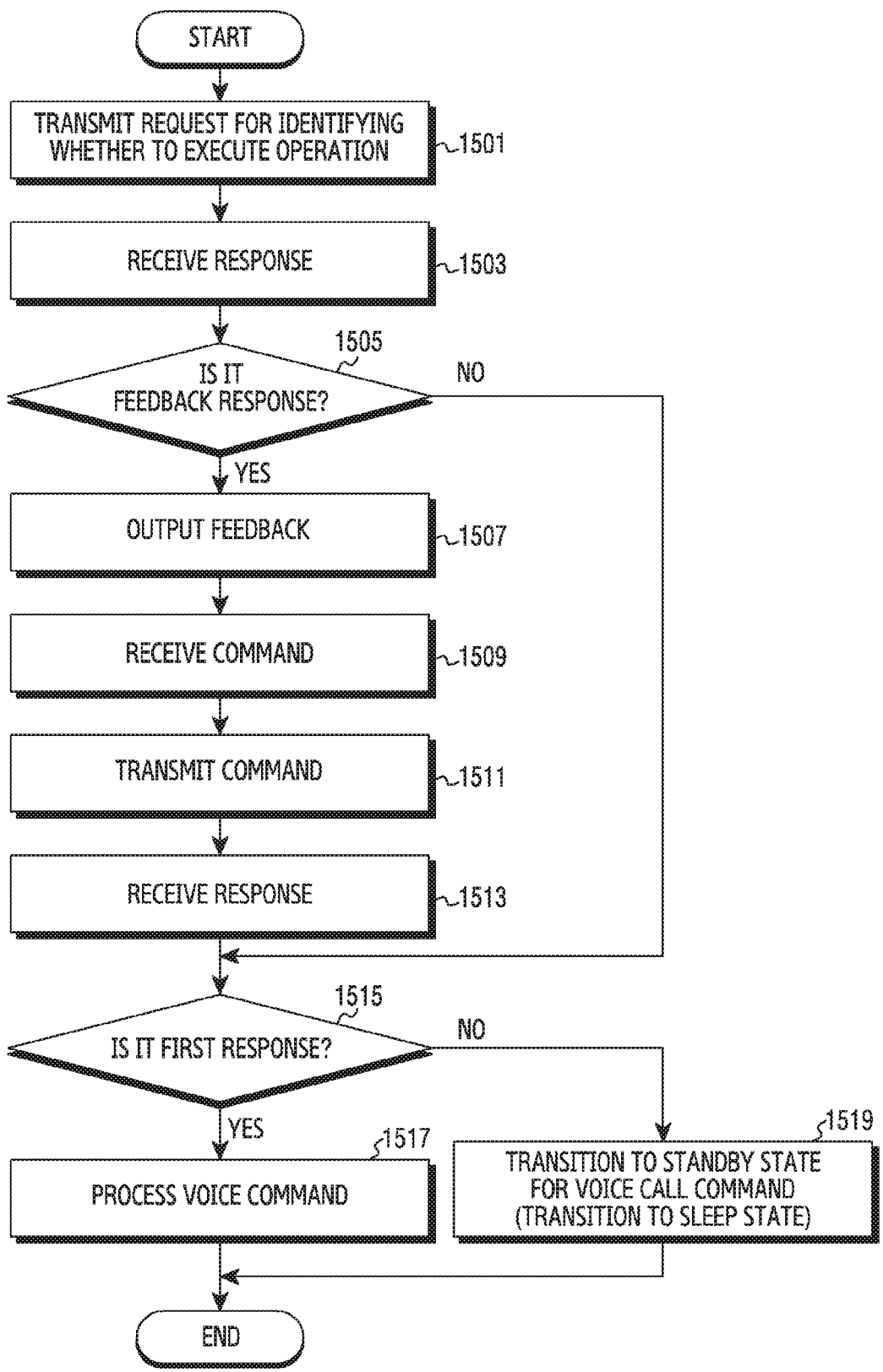
FIG. 15 is a flowchart illustrating an operation of processing a voice command in an electronic device according to various embodiments of the disclosure.

FIG. 15 is a flowchart illustrating an operation of processing a voice command in an electronic device according to various embodiments of the disclosure.

Referring to FIG. 15, in operation 1501, the processor 480 of the electronic device 400 may transmit to a server a request message for identifying whether to execute the voice command. According to an embodiment, upon calculating the score, the processor 480 may transmit service information including at least part of the calculated score information, device information, or a follow-up command to the server by using a configured communication interface (e.g., the wireless communication unit 410). According to various embodiments, the service information may include information for requesting the server to identify whether to execute the voice command.

In operation 1503, the processor 480 may receive from the server a response corresponding to a request for identifying whether to execute an operation.

In operation 1505, the processor 480 may decide whether a response received from the server corresponds to a feedback response. According to various embodiments, the processor 480 may decide, in sequence or in parallel, whether the response from the server is a feedback response, a first response for executing a voice command, or a second response for transitioning to a standby state.

If it is decided in operation 1505 that the received response is not the feedback response (NO in operation 1505), proceeding to operation 1515, the processor 480 may perform operation 1515 and subsequent operations.

If it is decided in operation 1505 that the received response is the feedback response (YES in operation 1505), in operation 1507, the processor 480 may output a feedback to request the user to designate a target device for executing the voice command on the basis of the feedback response. According to various embodiments, the processor 480 may guide information on selectable devices on the basis of device information included in the feedback response. According to various embodiments, the feedback output may be provided in a visual and/or auditory manner. According to an embodiment, a display may be used for a related text output, or a speaker may be used for a related audio output. Alternatively, the display and the speaker may be used to output both of them together.

In operation 1509, the processor 480 may receive a command based on user's utterance. According to an embodiment, a user may utter a voice for designating (selecting) a specific device in response to a device selection feedback.

In operation 1511, upon receiving a command, the processor 480 may transmit the input command to the server.

In operation 1513, the processor 480 may receive from the server a response corresponding to transmission of a command for designating a device.

In operation 1515, the processor 480 may decide whether the received response corresponds to a first response for instructing to process the voice command or a second response for instructing to transition to the standby state.

If it is decided in operation 1515 that the received response is the first response (YES in operation 1515), in operation 1517, the processor 480 may process the voice command. For example, the processor 480 may execute a voice recognition operation for user's utterance, and may process an operation related to execution of the related function.

If it is decided in operation 1515 that the received response is the second response (NO in operation 1515), in operation 1519, the processor 480 may transition to the standby state to wait for the voice call command. According to an embodiment, the electronic device 400 may transition to a sleep state.

An example of processing a voice command on the basis of interworking of an electronic device and a server has been described above according to various embodiments. Hereinafter, an example of processing a voice command on the basis of an electronic device without intervention of the server will be described according to various embodiments.

Figure 16:
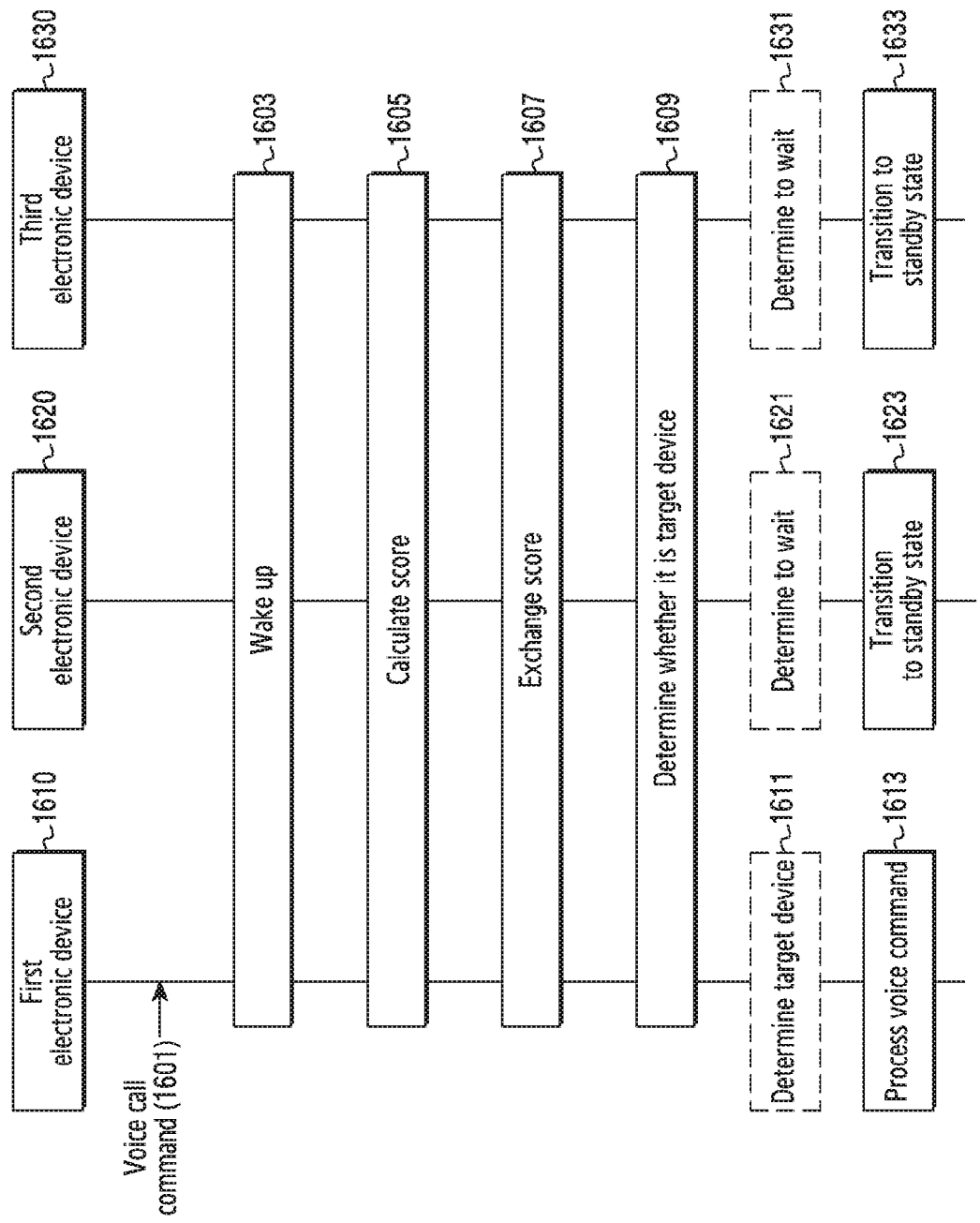
FIG. 16 illustrates an operation of processing a voice in a system according to various embodiments of the disclosure.

FIG. 16 illustrates an operation of processing a voice in a system according to various embodiments of the disclosure.

As shown in FIG. 16, a case shown in FIG. 16 may be as case where a first electronic device 1616, a second electronic device 1620, and a third electronic device 1630 are grouped based on a specific account, and the same voice call command is registered. In addition, FIG. 16 may show an example of processing a voice command based on interworking between electronic devices.

Referring to FIG. 16, in operation 1601, a user may utter a voice call command so that a voice command is executed in a specific electronic device. According to various embodiments, the user may utter the voice call command and a follow-up command, and may separately utter the follow-up command after waking up the electronic device on the basis of the voice call command.

In operation 1603, the first electronic device 1610, the second electronic device 1620, and the third electronic device 1630 may wake up on the basis of the voice call command. According to various embodiments, the first electronic device 1610, the second electronic device 1620, and the third electronic device 1630 may simultaneously wake up within a specific time range in sequence or in parallel at a time of recognizing the voice call command. According to various embodiments, the first electronic device 1610, the second electronic device 1620, and the third electronic device 1630 may receive and recognize the voice call command of the user through a microphone.

In operation 1605, the first electronic device 1610, the second electronic device 1620, and the third electronic device 1630 may calculate a recognition score of the voice call command. In various embodiments, the first electronic device 1610, the second electronic device 1620, and the third electronic device 1630 may calculate a recognition score for the voice call command of the user on the basis of the wake-up caused by the voice call command.

In operation 1607, the first electronic device 1610, the second electronic device 1620, and the third electronic device 1630 may exchange the calculated score with other electronic devices. According to an embodiment, the first electronic device 1610 may transmit a first score to the second electronic device 1620 and the third electronic device 1630. The first electronic device 1610 may receive a second score of the second electronic device 1620 and a third score of the third electronic device 1630 respectively from the second electronic device 1620 and the third electronic device 1630. For example, the electronic device 400 may transmit its score to other electronic devices, and may acquire scores thereof from the other electronic device with the same account.

In operation 1609, the first electronic device 1610, the second electronic device 1620, and the third electronic device 1630 may determine whether the device is a target device for executing a voice command on the basis of the score. According to an embodiment, the first electronic device 1610, the second electronic device 1620, and the third electronic device 1630 may compare a score thereof and a score acquired from a different electronic device to decide whether the device has a highest score. According to an embodiment, FIG. 16 may show a case where the first electronic device 1610 has a highest score, and the first electronic device 1610 is determined as the target device.

In operations 1611, 1621, and 1631, the first electronic device 1610, the second electronic device 1620, and the third electronic device 1630 may determine a target device or a transition to a standby state on the basis of a decision result. According to an embodiment, in operation 1611, the first electronic device 1610 may decide that it has a highest score and thus may determine the first electronic device 1610 as a target device for executing a voice command. According to an embodiment, in operations 1621 and 1631, the second electronic device 1620 and the third electronic device 1630 may decide that their scores are lower than the score of the first electronic device 1610 and thus may determine to wait for a next voice call command.

In operations 1613, 1623, and 1633, the first electronic device 1610, the second electronic device 1620, and the third electronic device 1630 may execute a corresponding operation on the basis of the determination result. According to an embodiment, in operation 1613, the first electronic device 1610 may operate to execute a voice command. For example, the first electronic device 1610 may operate to perform a related service based on the voice recognition (e.g., processing of the voice command and executing of a function related to the voice command). According to an embodiment, in operations 1623 and 1625, the second electronic device 1020 and the third electronic device 1030 may operate to transition to the standby state.

Figure 17:
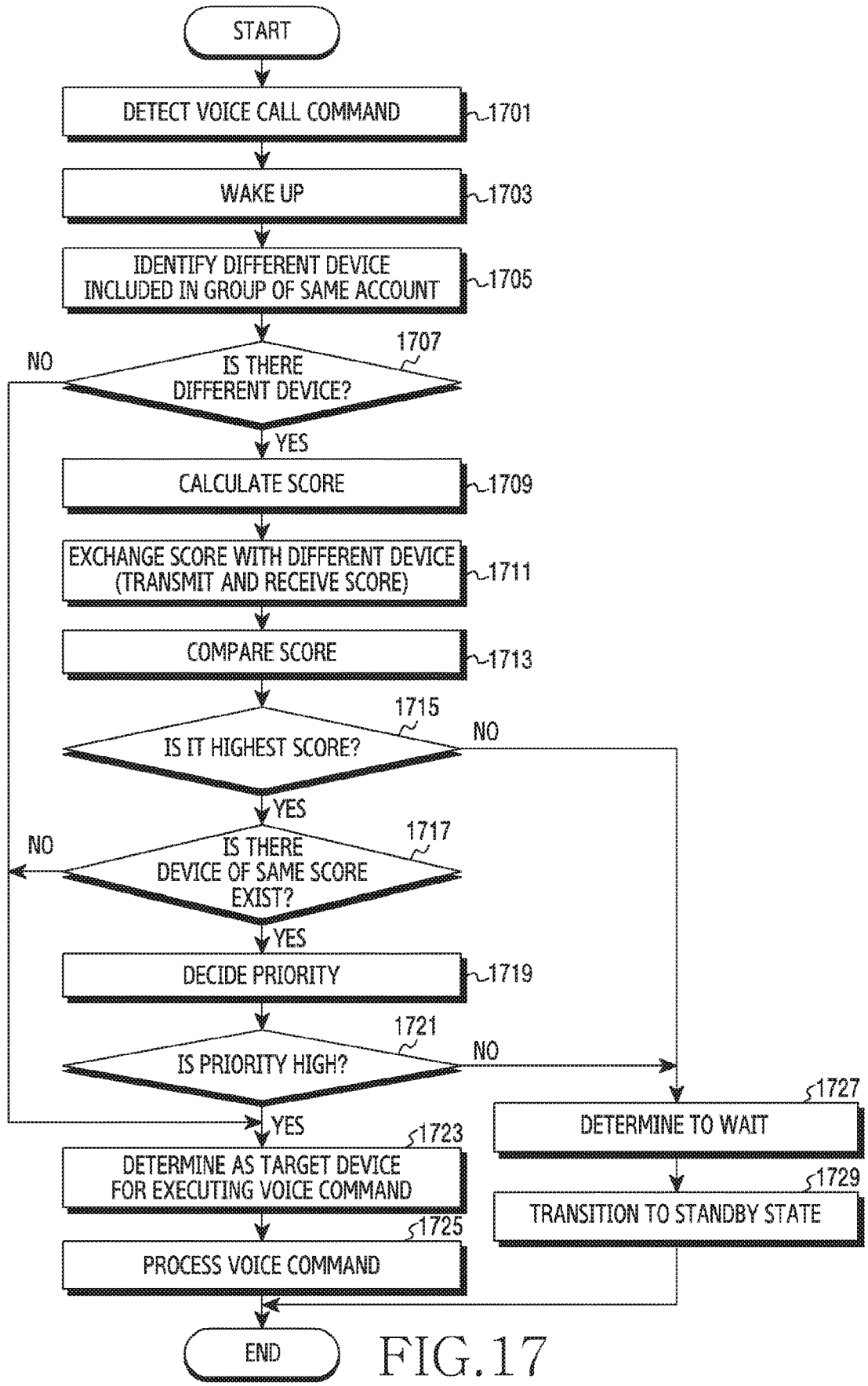
FIG. 17 is a flowchart illustrating an operation of processing a voice command in an electronic device according to various embodiments of the disclosure.

FIG. 17 is a flowchart illustrating an operation of processing a voice command in an electronic device according to various embodiments of the disclosure.

Referring to FIG. 17, in operation 1701, the processor 480 of the electronic device 400 may detect a voice call command. According to an embodiment, the electronic device 400 may recognize the voice call command through a microphone on the basis of a first processor (e.g., a wake-up processing unit, a wake-up engine) for recognizing the voice call command.

In operation 1703, the processor 480 may wake up in response to detection of the voice call command. According to an embodiment, the electronic device 400 may wake up a second processor (e.g., a follow-up command recognition unit, a voice recognition engine, a service control circuit), on the basis of voice call command detection of the first processor.

In operation 1705, the processor 480 may identify a different electronic device included in a group of the same account on the basis of the wake-up. According to an embodiment, the processor 480 may check whether there is an electronic device belonging to a group of which an account is the same as its own score by referring to pre-set information (e.g., a domain list).

In operation 1707, the processor 480 may decide whether there is the different electronic device grouped with the same account on the basis of the identification result.

If it is decided in operation 1707 that the different electronic device does not exist (NO in operation 1707), processing to operation 1721, the processor 480 may process operation 1721 and subsequent operations.

If it is decided in operation 1707 that the different electronic device exists (YES in operation 1707), in operation 1709, the processor 480 may calculate a recognition score of the voice call command. According to an embodiment, the processor 480 may calculate a score by considering various situations, as explained with reference to Equation 1 and FIG. 9.

In operation 1711, the processor 480 may exchange the calculated score with different electronic devices of the same account. For example, the electronic device 400 may use a configured communication interface (e.g., the wireless communication unit 410) to transmit its score to different electronic devices of the same account and receive their scores from the different electronic devices of the same account. According to an embodiment, upon calculating the score, the processor 480 may use the configured communication interface (e.g., the wireless communication unit 410) to perform an operation of exchanging the calculated score information and device information with the different electronic device.

In operation 1713, the processor 480 may compare its score with a score received from the different electronic device.

In operation 1715, the processor 480 may decide whether its score corresponds to a highest score on the basis of a comparison result.

If it is decided in operation 1715 that its score is not the highest score (NO in operation 1715), proceeding to operation 1727, the processor 480 may perform operation 1727 and subsequent operations.

If it is decided in operation 1715 that its score is the highest score (YES in operation 1715), in operation 1717, the processor 480 may decide whether there is a different electronic device of the same score. According to an embodiment, the processor 480 may decide whether there is a score which is the same as its own score among scores of different electronic devices grouped with the same account.

If it is decided in operation 1717 that there is no different electronic device of the same score (NO in operation 1717), proceeding to operation 1723, the processor 480 may perform operation 1723 and subsequent operations.

If it is decided in operation 1717 that the different electronic device of the same score exists (YES in operation 1717), in operation 1719, the processor 480 may decide a priority. According to an embodiment, there may be one or more different electronic devices having the same score. The processor 480 may decide whether to apply a priority according to a pre-set priority. According to various embodiments, per-device priority information may be set in a domain list. According to various embodiments, the deciding of whether to apply the priority may be determined based on a different determination condition (e.g., a follow-up command (e.g., a device designation command, a domain command)) as shown in the drawings described below.

In operation 1721, on the basis of the decision result, the processor 480 may decide whether the priority is higher compared to a different electronic device or whether the priority is lower compared to the different electronic device.

If it is decided in operation 1721 that the priority is high (YES in operation 1721), in operation 1723, the processor 480 may determine that it is a target device for executing a voice command.

In operation 1725, the processor 480 may process the voice command in response to the determination of the target device. For example, the processor 480 may execute a voice recognition operation for user's utterance, and may process an operation related to execution of the related function.

If it is decided in operation 1721 that the priority is low (NO in operation 1721), in operation 1727, the processor 480 may determine to wait for the voice call command.

In operation 1729, the processor 480 may transition to the standby state in response to the determination of waiting. According to an embodiment, the processor 480 may allow the electronic device 400 to transition to a sleep state to wait for the voice call command, and may not execute a voice recognition operation for the user's utterance.

Figure 18:
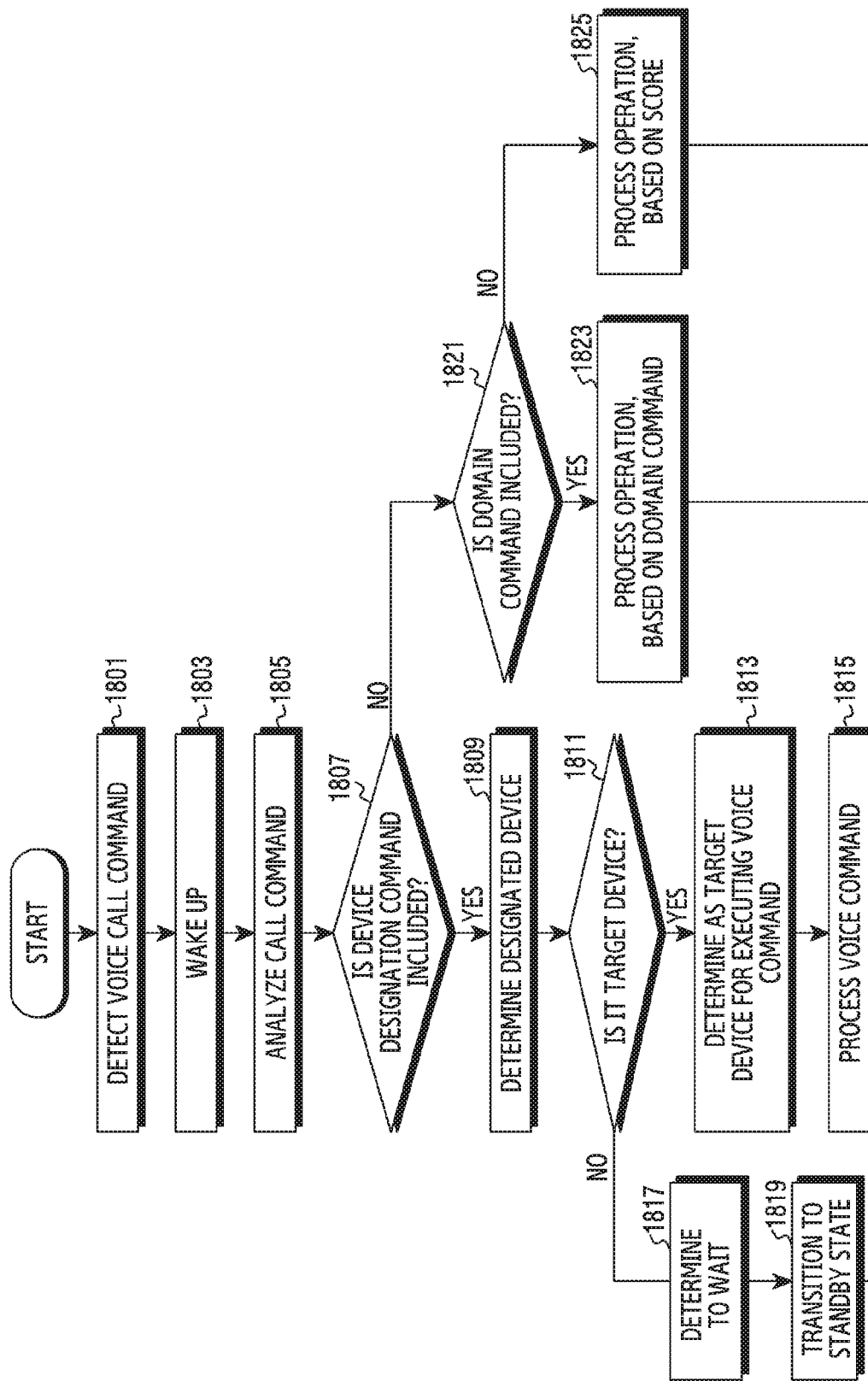
FIG. 18 is a flowchart illustrating an example of determining a target device for executing a voice command in an electronic device according to various embodiments of the disclosure.

FIG. 18 is a flowchart illustrating an example of determining a target device for executing a voice command in an electronic device according to various embodiments of the disclosure.

Referring to FIG. 18, in operation 1801, the processor 480 of the electronic device 400 may detect a voice call command. According to an embodiment, the electronic device 400 may recognize the voice call command through a microphone on the basis of a first processor (e.g., a wake-up processing unit, a wake-up engine) for recognizing the voice call command.

In operation 1803, the processor 480 may wake up in response to detection of the voice call command. According to an embodiment, the electronic device 400 may wake up a second processor (e.g., a follow-up command recognition unit, a voice recognition engine, a service control circuit), on the basis of voice call command detection of the first processor.

In operation 1805, the processor 480 may analyze the voice call command on the basis of the wake-up. According to an embodiment, the processor 480 may decide a determination condition to be considered to determine whether a device designation command (e.g., "phone", etc.) is included together with the voice call command, or whether a domain command (e.g., "music playback", etc.) is included, or the like. According to various embodiments, the determination condition may include one or more of the device designation command and the domain command.

In operation 1807, the processor 480 may decide whether the device designation command is included on the basis of an analysis result.

If it is decided in operation 1807 that the device designation command is included (YES in operation 1807), in operation 1809, the processor 480 may decide a designated device. For example, the processor 480 may determine whether the designated device is its electronic device 400 according to the device designation command.

In operation 1811, the processor 480 may decide whether the device is a target device for executing a voice command on the basis of the decision result. According to an embodiment, the processor 480 may decide whether the device designation command corresponds to device information (e.g., a device name) indicating the electronic device 400.

If it is decided in operation 1811 that the device designation command indicates the electronic device 400 (YES in operation 1811), in operation 1813, the processor 480 may determine the electronic device 400 as the target device for executing the voice command. According to an embodiment, if the device designated in the device designation command is its electronic device 400, the processor 480 may determine the device as the target device for executing the voice command.

In operation 1815, the processor 480 may process the voice command in response to the determination of the target device. For example, the processor 480 may execute a voice recognition operation for user's utterance, and may process an operation related to execution of the related function.

If it is decided in operation 1811 that the device designation command indicates a different electronic device (NO in operation 1811), in operation 1817, the processor 480 may determine to wait for the voice call command.

In operation 1819, the processor 480 may transition to the standby state in response to the determination of waiting. According to an embodiment, the processor 480 may allow the electronic device 400 to transition to a sleep state to wait for the voice call command, and may not execute a voice recognition operation for the user's utterance.

If it is decided in operation 1807 that the device designation command is not included (NO in operation 1807), in operation 1821, the processor 480 may decide whether a domain command is included.

If it is decided in operation 1821 that the domain command is included (YES in operation 1821), in operation 1823, the processor 480 may process a related operation on the basis of the domain command. A specific example for this will be described in detail with reference to FIG. 19.

If it is decided in operation 1821 that the domain command is not included (NO in operation 1821), in operation 1825, the processor 480 may process a related operation, such as determining of a target device for executing a voice command on the basis of a score of devices grouped with the same account.

Figure 19:
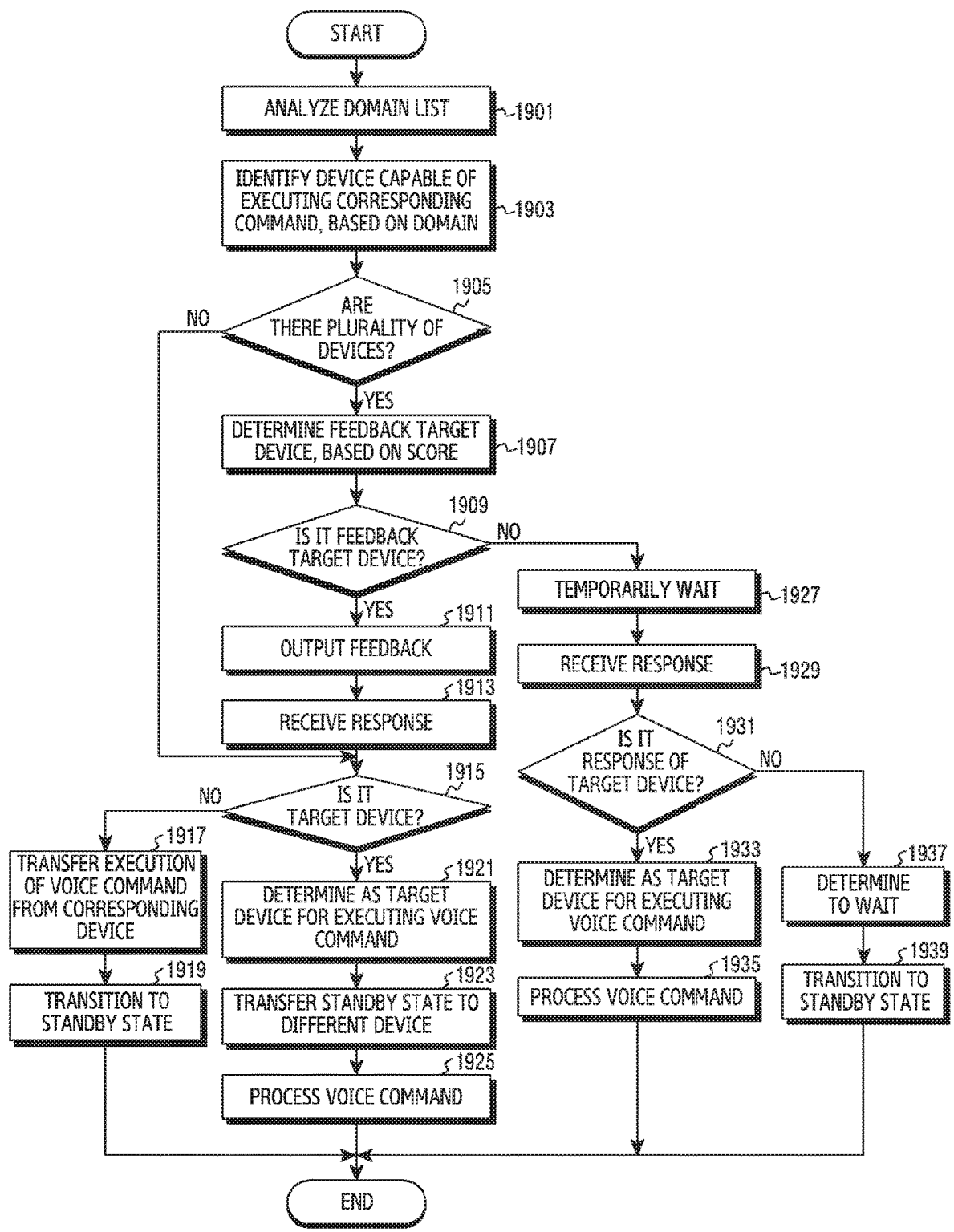
FIG. 19 is a flowchart illustrating an example of determining a target device for executing a voice command in an electronic device according to various embodiments of the disclosure.

FIG. 19 is a flowchart illustrating an example of determining a target device for executing a voice command in an electronic device according to various embodiments of the disclosure.

Referring to FIG. 19, in operation 1901, if it is decided that a domain command is included, the processor 480 of the electronic device 400 may analyze a domain list.

In operation 1903, the processor 480 may identify one or more devices capable of executing a command (function) based on the domain command among devices grouped with the same account, on the basis of an analysis result of the domain list. According to various embodiments, if it is decided that a command based on the domain command cannot be executed in the electronic device 400, the processor 480 may provide control to automatically transition to a standby state while omitting operations described below. In the example of FIG. 19, the electronic device 400 may be exemplified as the device capable of executing the command (function) based on the domain command.

In operation 1905, the processor 480 may decide whether a plurality of devices are capable of executing the command on the basis of the identification result. For example, it may be decided whether there are different electronic devices having the same domain among devices grouped with the same account.

If it is decided in operation 1905 that there is one device capable of executing the command (NO in operation 1905), proceeding to operation 1921, the processor 480 may perform operation 1921 and subsequent operations. For example, the processor 480 may determine the electronic device 400 as the target device for executing the voice command.

If it is decided in operation 1905 that the plurality of devices are capable of executing the command (YES in operation 1905), in operation 1907, the processor 480 may determine a feedback target device on the basis of a score of corresponding electronic devices. According to an embodiment, the processor 480 may determine an electronic device having a highest score among the plurality of electronic devices capable of executing the command as a device for feedback of the user. For example, the processor 480 may provide the feedback to the user to determine (or select) a target device for executing a voice command by using Text To Speech (TTS) or other methods or the like.

In operation 1909, the processor 480 may decide whether the electronic device 400 is a feedback target device. According to an embodiment, if the electronic device 400 has a highest score, the processor 480 may decide that the electronic device 400 is the feedback target device. If the electronic device 400 does not have the highest score, the processor 480 may decide that the electronic device 400 is not the feedback target device.

If it is decided in operation 1909 that the electronic device 400 is the feedback target device (YES in operation 1909), in operation 1911, the processor 480 may output a feedback. According to various embodiments, the processor 480 may guide information for a request to select any one of selectable devices for executing a command. According to various embodiments, the feedback output may be provided in a visual and/or auditory manner. According to an embodiment, a display may be used for a related text output, or a speaker may be used for a related audio output. Alternatively, the display and the speaker may be used to output both of them together.

In operation 1913, the processor 480 may receive a response based on user's utterance. According to an embodiment, a user may utter a voice for designating (selecting) a specific device in response to a device selection feedback.

In operation 1915, upon receiving a response corresponding to the feedback output, the processor 480 may decide whether the electronic device 400 is a target device for executing a voice command. According to an embodiment, the processor 480 may decide whether the response designates the electronic device 400 or designates a different electronic device.

If it is decided in operation 1915 that a user's response indicates a different electronic device (NO in operation 1915), in operation 1917, the processor 480 may transfer a response for instructing a designated different electronic device to execute the voice command. According to an embodiment, the processor 480 may transmit a first response for instructing a corresponding target device to execute the voice command.

In operation 1919, the processor 480 may transition to the standby state. According to an embodiment, the processor 480 may allow the electronic device 400 to transition to a sleep state to wait for the voice call command, and may not execute a voice recognition operation for the user's utterance.

If it is decided in operation 1915 that the user's response indicates the electronic device 400 (YES in operation 1915), in operation 1921, the processor 480 may determine the electronic device 400 as the target device for executing the voice command.

In operation 1923, the processor 480 may transfer a response for instructing a different electronic device to transition to the standby state in response to the determination of the target device. According to an embodiment, the processor 480 may transmit a second response for instructing the different electronic device to transition to the standby state for waiting for the voice call command.

In operation 1925, the processor 480 may process the voice command in response to the determination of the target device. For example, the processor 480 may execute a voice recognition operation for user's utterance, and may process an operation related to execution of the related function.

If it is decided in operation 1909 that the electronic device 400 is not the feedback target device (NO in operation 1909), in operation 1927, the processor 480 may wait to receive a response from a different electronic device. According to an embodiment, the processor 480 may exist in the standby state (e.g., a time-based temporary standby state rather than waiting in a sleep state) for receiving a response during a pre-set specific time. According to another embodiment, the processor 480 may process an automatic transition to the standby state (e.g., a sleep state) at the expiry of the specific time set in the temporary standby state.

In operation 1929, the processor 480 may receive a response from a different electronic device.

In operation 1931, the processor 480 may decide whether the received response corresponds to a first response for instructing to process the voice command or a second response for instructing to transition to the standby state.

If it is decided in operation 1931 that the received response is the first response (YES in operation 1931), in operation 1933, the processor 480 may determine the electronic device 400 as the target device for executing the voice command.

In operation 1935, the processor 480 may process the voice command in response to the determination of the target device. For example, the processor 480 may execute a voice recognition operation for user's utterance, and may process an operation related to execution of the related function.

If it is decided in operation 1931 that the received response is the second response (NO in operation 1931), in operation 1937, the processor 480 may determine to wait for the voice call command.

In operation 1939, the processor 480 may transition to the standby state in response to the determination of waiting. According to an embodiment, the processor 480 may allow the electronic device 400 to transition to a sleep state to wait for the voice call command, and may not execute a voice recognition operation for the user's utterance.

As described above, a method of operating an electronic device according to various embodiments may include waking up on the basis of detection of a voice call command, calculating a score related to recognition of the voice call command, sharing the score with an external device, deciding whether to execute a voice command on the basis of the score, and processing the voice command on the basis of the decision result.

According to various embodiments, the calculating of the score may include calculating the score, based at least in part on a distance to a user, an environment of the electronic device, a location of the electronic device, a domain of the electronic device, or a voice recognition rate.

According to various embodiments, the deciding of whether to execute the voice command may include transmitting the calculated score to the external device, receive a response determined based on the score from the external device, and determining whether to process the voice command on the basis of the received response.

According to various embodiments, the processing of the voice command may include processing the voice command if the response from the external device is a first response for instructing to process the voice command, and transitioning to a standby state if the response from the external device is a second response for instructing to transition to the standby state.

According to various embodiments, the processing of the voice command may include outputting a related feedback if the response from the external device is a feedback response for requesting a user to select a device, and acquiring a device designation command of the user for the feedback.

According to various embodiments, the deciding of whether to execute the voice command may include deciding a score of the electronic device and a score acquired by the external device, and if the score of the electronic device is high, determining the device as a target device for processing the voice command.

According to various embodiments, the deciding of whether to execute the voice command may include determining whether to process the voice command on the basis of a device designation command or a domain command.

According to various embodiments, the deciding of whether to execute the voice command may include determining a feedback target device on the basis of the score if a plurality of electronic devices include a related domain among devices grouped with the same account on the basis of the domain command, acquiring device selection performed by a user on the basis of the determined feedback target device, and determining an electronic device corresponding to the device selection performed by the user as a target device for executing a voice command.

According to various embodiments, the method may further include acquiring the determination of the feedback target device and the determination of the target device from the external device.

According to various embodiments, the external device may determine a target device for executing the voice command, based at least in part on a score of electronic devices grouped with the same account, a device designation command, or a domain command, transmit a first response for instructing to process the voice command to the determined target device, and transmit a second response for instructing a different electronic device other than the target device among the electronic devices to transition to a standby state. The electronic device may process the voice command on the basis of receiving of the first response from the external device, or transition to the standby state on the basis of receiving of the second response.

According to various embodiments, the voice command may be determined to be processed by any one of a plurality of electronic devices which wake up on the basis of the voice call command and which are grouped with the same account.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

What is claimed is:

1. An electronic device comprising:
   a microphone;
   communication circuitry;
   a memory; and
   a processor operatively coupled to the microphone and the memory, wherein the processor is configured to:
   detect a voice command including a voice call command using the microphone;
   obtain a score related to the voice call command;
   control the communication circuitry to transmit a request including information on the score to a server;
   when the electronic device is determined as a feedback target device based on the score, receive a first response to the request from the server using the communication circuitry;
   in response to the first response being a feedback command, output a feedback for requesting a user to select a target device performing the voice command, wherein the feedback includes guide information on selectable devices as the target device;
   in response to the feedback, detect a speech of the user selecting the target device using the microphone; and process an operation related to the voice command based on the detected speech, the processing of the operation comprising:
 based on the detected speech of the user indicating the electronic device, determining the electronic device as the target device, transferring a signal for instructing a different electronic device to transition to a standby state, and processing the voice command; and
 based on the detected speech of the user indicating the different electronic device, transferring a signal for instructing the different electronic device to execute the voice command, and transition to the standby state to wait for the voice call command.

2. The electronic device of claim 1, wherein the processor comprises:
 a first processor configured to recognize the voice call command; and
 a second processor configured to wake up based on detection of the voice call command of the first processor and to process voice recognition and the operation related to the voice command.

3. The electronic device of claim 1, wherein the processor is configured to obtain the score, based at least in part on a distance to a user, an environment of the electronic device, a location of the electronic device, a domain of the electronic device, or a voice recognition rate.

4. The electronic device of claim 1, wherein the processor is configured to:
 control the communication circuitry to transmit the speech to the server;
 receive a second response responsive to the speech from the server using the communication circuitry; and
 determine whether to process the voice command based on the received second response.

5. The electronic device of claim 4, wherein the processor is configured to:
 process the voice command based on the second response from the server being a response for instructing to process the voice command; and
 transition to a standby state based on the second response from the server being a response for instructing to transition to the standby state.

6. A method of providing a voice service in an electronic device, the method comprising:
 detecting a voice command including a voice call command using a microphone of the electronic device;
 obtaining a score related to the voice call command;
 transmitting, using communication circuitry of the electronic device, a request including information on the score to a server;
 receiving a first response to the request from the server using the communication circuitry, when the electronic device is determined as a feedback target device based on the score;
 in response to the first response being a feedback command, outputting a feedback for requesting a user to select a target device performing the voice command, wherein the feedback includes guide information on selectable devices as the target device;
 in response to the feedback, detecting a speech of the user selecting the electronic device as the target device using the microphone; and
 processing on operation related to the voice command based on the detected speech, the processing operation comprising:
 based on the detected speech of the user indicating the electronic device, determining the electronic device as the target device, transferring a signal for instructing a different electronic device to transition to a standby state, and processing the voice command; and
 based on the detected speech of the user indicating the different electronic device, transferring a signal for instructing the different electronic device to execute the voice command, and transition to the standby state to wait for the voice call command.

7. The method of claim 6, wherein the deciding of whether to execute the voice command comprises:
 transmitting the speech to the server;
 receiving a second response responsive to the speech from the server using the communication circuitry; and
 determining whether to process the voice command based on the received second response.

8. The method of claim 7, wherein the processing of the voice command comprises:
 processing the voice command based on the second response from the server being a response for instructing to process the voice command; and
 transitioning to a standby state based on the second response from the server being a response for instructing to transition to the standby state.

9. The method of claim 6, wherein the obtaining of the score comprises:
 obtaining the score based at least in part on a distance to a user, an environment of the electronic device, a location of the electronic device, a domain of the electronic device, or a voice recognition rate.

* * * * *